US010192185B2

(12) United States Patent
Tomii et al.

(10) Patent No.: US 10,192,185 B2
(45) Date of Patent: Jan. 29, 2019

(54) FARMLAND MANAGEMENT SYSTEM AND FARMLAND MANAGEMENT METHOD

(71) Applicants: Yasuhiro Tomii, Kanagawa (JP);
Shohei Matsumura, Kanagawa (JP);
Takashi Noguchi, Kanagawa (JP);
Kensuke Masuda, Kanagawa (JP);
Kohji Oshikiri, Kanagawa (JP);
Takeshi Denda, Kanagawa (JP);
Hirokazu Takenaka, Kanagawa (JP);
Yuji Yamanaka, Tokyo (JP)

(72) Inventors: Yasuhiro Tomii, Kanagawa (JP);
Shohei Matsumura, Kanagawa (JP);
Takashi Noguchi, Kanagawa (JP);
Kensuke Masuda, Kanagawa (JP);
Kohji Oshikiri, Kanagawa (JP);
Takeshi Denda, Kanagawa (JP);
Hirokazu Takenaka, Kanagawa (JP);
Yuji Yamanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 409 days.

(21) Appl. No.: 14/835,877

(22) Filed: Aug. 26, 2015

(65) Prior Publication Data

US 2016/0063420 A1    Mar. 3, 2016

(30) Foreign Application Priority Data

Aug. 29, 2014  (JP) .................. 2014-175800
Jun. 25, 2015  (JP) .................. 2015-128115

(51) Int. Cl.
*G06Q 10/06*  (2012.01)
*G06Q 50/02*  (2012.01)

(52) U.S. Cl.
CPC . *G06Q 10/06315* (2013.01); *G06Q 10/06314* (2013.01); *G06Q 50/02* (2013.01)

(58) Field of Classification Search
CPC ......... G06Q 10/00; G06Q 40/06; G06F 17/60
(Continued)

(56) References Cited

U.S. PATENT DOCUMENTS 5,884,225 A *  3/1999  Allen ................. A01G 7/00
                                              702/3
9,317,827 B2 *  4/2016  Watanabe ...... G06Q 10/063114
2010/0306012 A1 * 12/2010  Zyskowski ............ G06Q 10/06
                                              705/7.36

FOREIGN PATENT DOCUMENTS

JP    2003-018918    1/2003
JP    2011-214423    10/2011
JP    2014-026378    2/2014

OTHER PUBLICATIONS

Florence et al "Fuzzy edge detection for omnidirectional images", Dec. 2008, Laboratoire d'Informatique, de Robotique et de Microélectronique de Montpellier,, 34392 Montpellier Cedex 5, France, pp. 1991-2010.*

(Continued)

*Primary Examiner* — Romain Jeanty
(74) *Attorney, Agent, or Firm* — IPUSA, PLLC

(57) ABSTRACT

A farmland management system includes an information detection unit configured to acquire information relating to a crop being cultivated, a storage unit configured to store crop registration information for estimating a growth condition of the crop, a growth estimation unit configured to refer to the crop registration information and estimate the growth condition of the crop based on the information relating to the crop and the crop registration information, and a display unit configured to display the growth condition estimated by the growth estimation unit.

11 Claims, 28 Drawing Sheets

(58) Field of Classification Search
USPC .................................................. 705/7.24
See application file for complete search history.

(56) References Cited

OTHER PUBLICATIONS

Logan et al "Greenhouse Tomato Limited Cluster Production Systems: Crop Management Practices Affect Yield", Mar. 2008, LIRMM, Laboratoire d'Informatique, de Robotique et de Microélectronique de Montpellier, 161, rue Ada, 34392 Montpellier Cedex 5, France, pp. 1991-2010.*

W. Vanden "A Decision Support System for Field Vegetable Crops: Focus on Fertilization", Proc. Workshop Eco. Fertilization Veg. Eds. R. Booij & J. Neeteson Acta Hort. 571. (Year: 2002).*

Paul Deran "Light-emitting diode (LED) lighting for greenhouse tomato production", department of Bioresource Engineering, McGrill University, Montreal, pp. 1-115 (Year: 2013).*

* cited by examiner

FARMLAND MANAGEMENT SYSTEM AND FARMLAND MANAGEMENT METHOD

BACKGROUND OF THE INVENTION

1. Field of the Invention

The present invention relates to a farmland management system and a farmland management method for managing farmlands.

2. Description of the Related Art

Applying information technology to farmlands (including farms and ranches) is not easy because the quality and yield of farming products largely depend on natural environmental conditions such as the weather. However, in view of the aging population and the shortage of agricultural manpower, there is a growing demand for improving productivity in farmlands. Also, there is a demand for applying information technology to know-how associated with cultivating crops in order to support people that are not necessarily experienced in crop cultivation.

In view of such demands, some applications of information technology to farmlands have been proposed (e.g., see Japanese Laid-Open Patent Publication No. 2003-18918). Japanese Laid-Open Patent Publication No. 2003-18918 discloses a farm management system for determining conditions of a farm from a remote location other than the farm and remotely managing the farm.

Even when information technology is applied to farmlands, there is still a demand for achieving high quality and high yield of crops that are harvested. However, conventional applications of information technology to farmlands do not include techniques for detecting information relating to crops, and estimating/determining growth conditions of the crops based on the detected information relating to the crops.

That is, owing to the conventional practice of relying on know-how such as the experience and intuition of the cultivator in managing information such as environmental information affecting crop quality and growth, for example, and controlling operations such as irrigation to adjust the moisture in the soil, for example, the quality and yield of crops may significantly vary depending on the cultivator.

Also, in order to determine how information on the moisture in the soil and the like affects the crop quality and yield, for example, a farming/cultivation log is preferably kept for collecting data affecting the growth of crops. However, such a detailed farming/cultivation log is not generated in conventional farmland information technology applications.

SUMMARY OF THE INVENTION

In view of the above problems of the related art, an aspect of the present invention is directed to providing a farmland management system for reducing variations in the quality and yield of crops.

According to one embodiment of the present invention, a farmland management system includes an information detection unit configured to acquire information relating to a crop being cultivated, a storage unit configured to store crop registration information for estimating a growth condition of the crop, a growth estimation unit configured to refer to the crop registration information and estimate the growth condition of the crop based on the information relating to the crop and the crop registration information, and a display unit configured to display the growth condition estimated by the growth estimation unit.

DESCRIPTION OF THE PREFERRED EMBODIMENTS

In the following, embodiments of the present invention are described with reference to the accompanying drawings.

Figure 1:
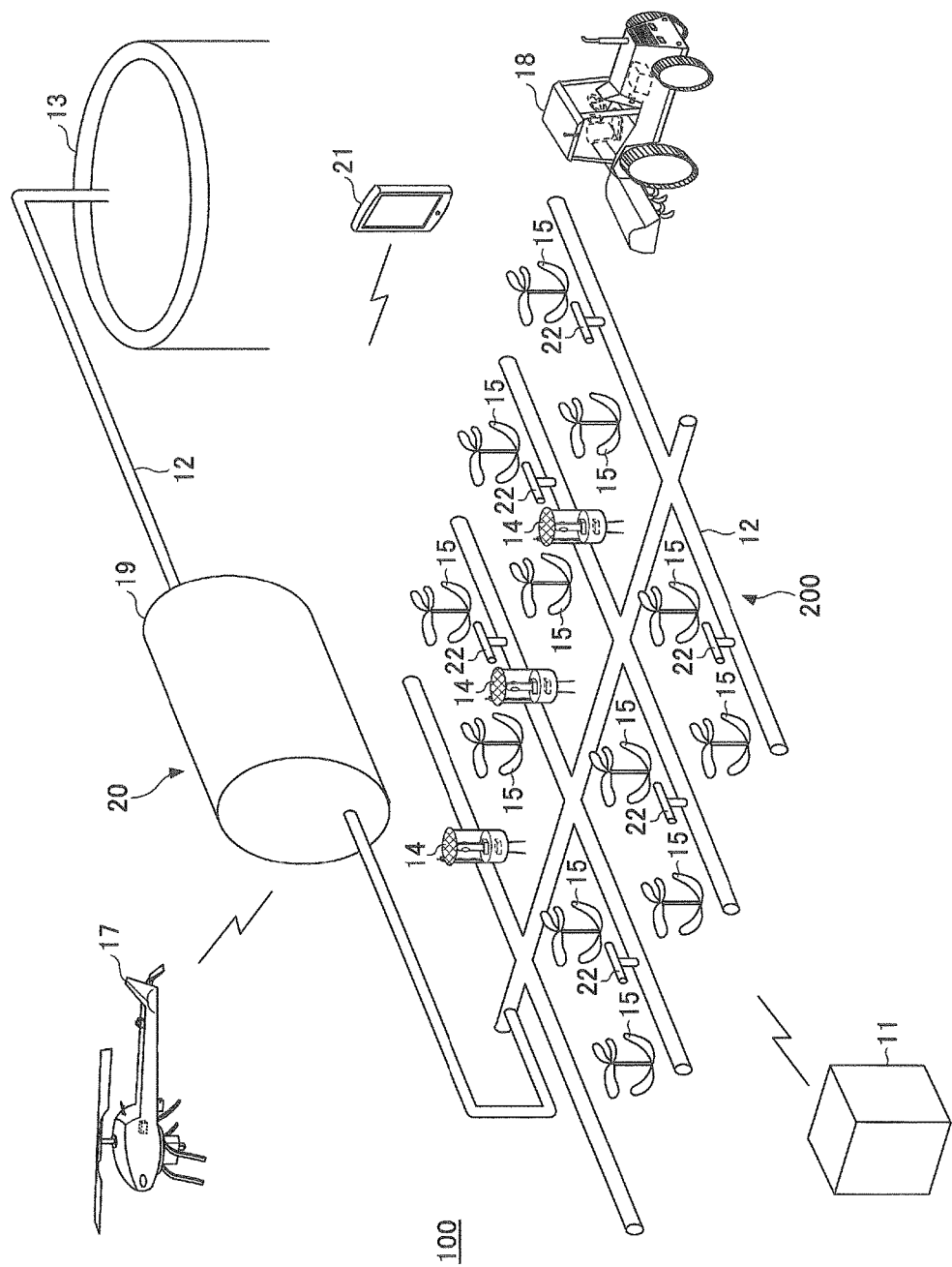
FIG. 1 schematically illustrates an exemplary farmland management system according to an embodiment of the present invention.

FIG. 1 schematically illustrates an example of a farmland management system 100. The farmland management system 100 includes an irrigation apparatus 20, a monitoring apparatus 14, and a server 11.

The irrigation apparatus 20 includes a water source 13, a water pressure feeding apparatus 19, a pipe 12 that acts as a water flow path, and sprinklers 22. The water source 13 may be, for example, a well, a water supply system, or any resource that is capable of providing water. The water pressure feeding apparatus 19 is installed at a point along a path extending from the water source 13 to a farmland 200. Water pumped from the water source 13 is supplied to the farmland 200 through the pipe 12 and is sprinkled on crops 15 via the sprinklers 22.

Note that the irrigation apparatus 20 may act as a water supplying apparatus for irrigating the crops 15 by supplying water via the sprinklers 22, and also as a fertilizing apparatus for supplying liquid fertilizer that is mixed into the water to the crops 15. Also, the water pressure feeding apparatus 19 includes a control panel for controlling irrigation or fertilization based on conditions such as the time and farmland information that has been acquired.

The sprinkler 22 is a water sprinkling unit that sprinkles pumped water onto the farmland 200 while a solenoid valve installed at the pipe 12 is open. Note that the water sprinkling operations may be stopped by closing the solenoid valve. Opening and closing of the solenoid valve may be controlled by either the server 11 or the monitoring apparatus 14. The water pressure feeding apparatus 19 measures the amount of water supplied to the farmland 200 using a flow rate sensor and/or a pressure sensor arranged at the pipe 12.

Figure 3A:
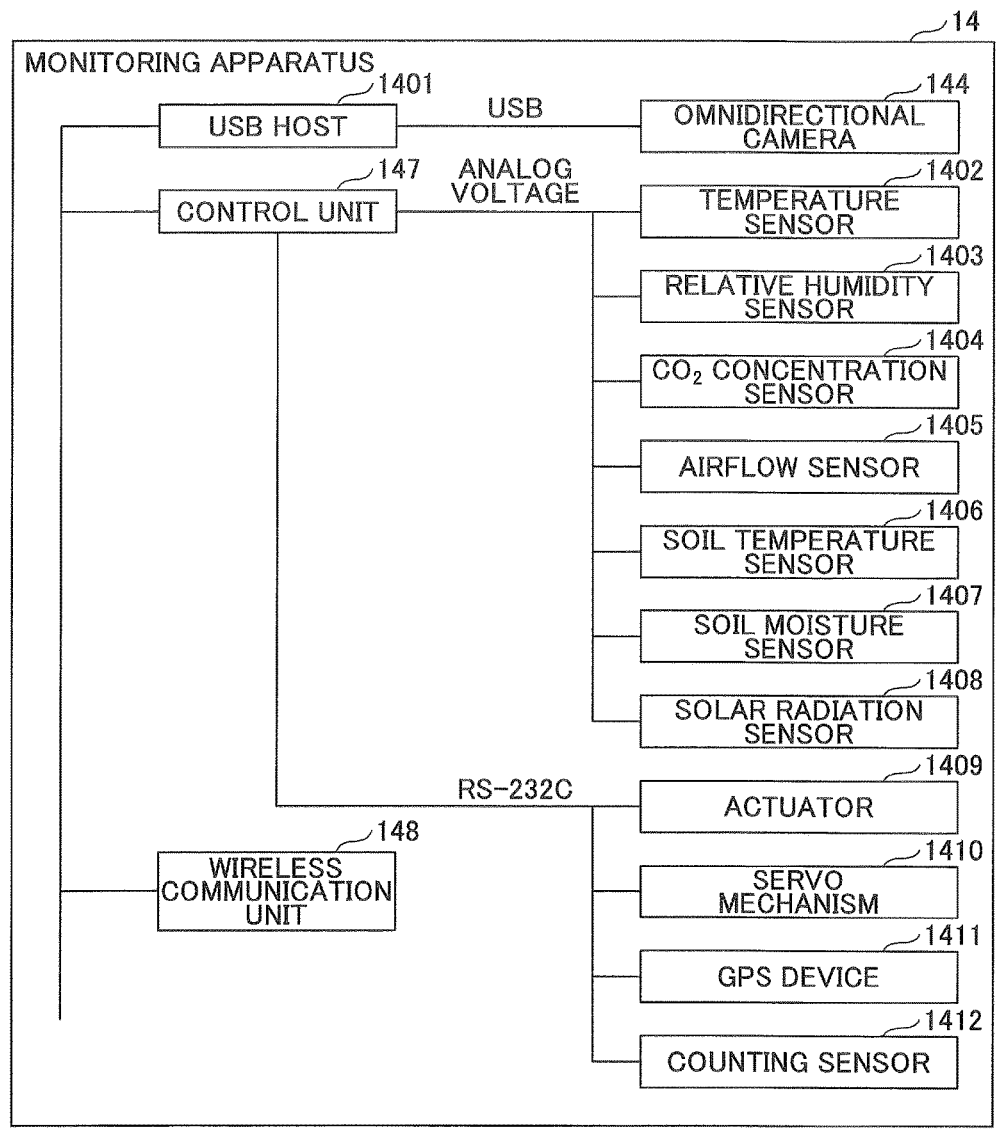
FIGS. 3A and 3B illustrate examples of sensors and peripheral devices that are connected to the monitoring apparatus.
Figure 3B:
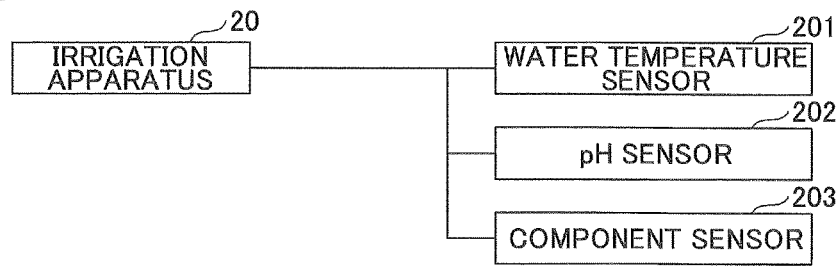

Further, as illustrated in FIG. 3B, a water temperature sensor 201, a pH sensor 202, and a component sensor 203 are connected to the irrigation apparatus 20, and factors affecting growth such as the temperature, the pH, and the components of water are monitored. Information such as the amount of water discharged is transmitted to the server 11. Note that in some embodiments a part or all of the factors affecting growth such as the amount of water discharged, the water temperature, the pH of the water, and the components of the water may be monitored by the monitoring apparatus 14.

The server 11 may receive, for example, an output value of a temperature sensor 1402 (described below) of the monitoring apparatus 14 or the amount of water discharged from the irrigation apparatus 20 as an input, and determine whether there is an abnormality due to a fault in the growing environment. When an abnormality is recognized, the server 11 may transmit an alarm for notifying the substance of the abnormality to the terminal 21 by e-mail through a mail server, for example.

The terminal 21 enables browsing of information including measurements obtained by the monitoring apparatus 14 and the irrigation apparatus 20 that have been accumulated in the server 11 via a browser.

Note that the farmland management system 100 also includes a moving object 17, an agricultural machine 18, and the terminal 21, which are described in detail below.

Figure 2:
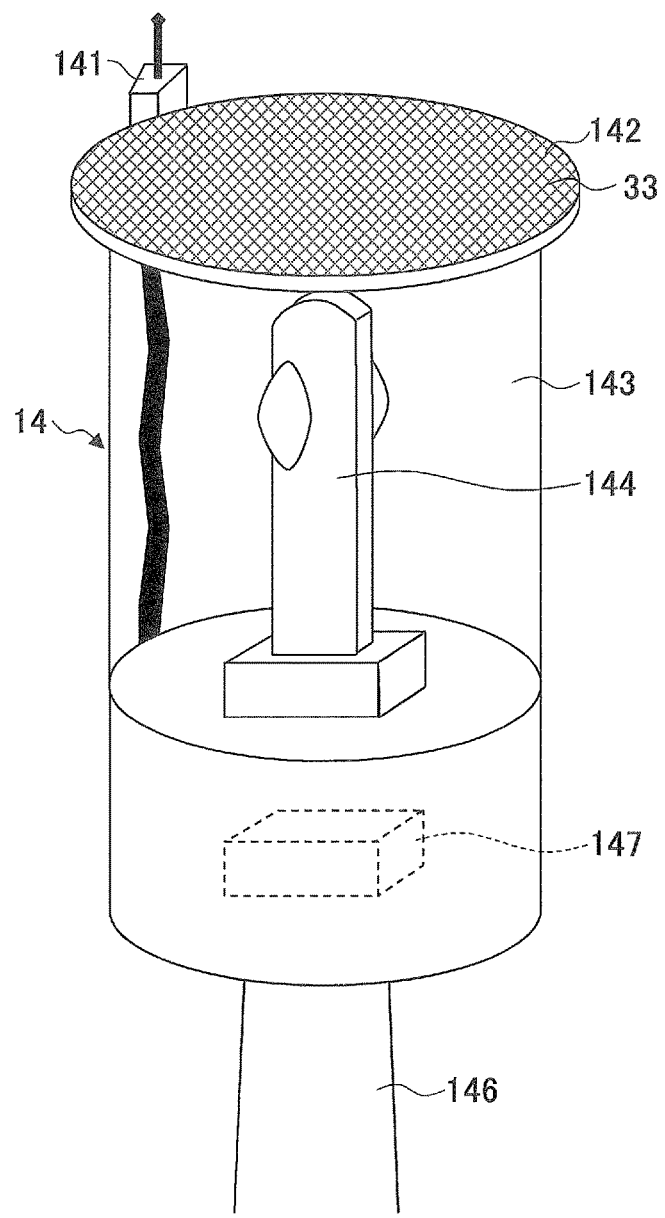
FIG. 2 is an external view of an exemplary monitoring apparatus.

In the following, the monitoring apparatus 14 is described with reference to FIGS. 2 and 3. FIG. 2 is an exemplary external view of the monitoring apparatus 14. FIG. 3 illustrates examples of sensors and peripheral devices that are connected to the monitoring apparatus 14.

The monitoring apparatus 14 includes an omnidirectional camera 144 for capturing an image of the farmland 200. The omnidirectional camera 144 is capable of capturing a 360-degree image around the camera in one shooting. By installing such an omnidirectional camera 144 in the farmland 200, environmental conditions such as the weather may be monitored based on an image of the sky in addition to monitoring conditions of the farmland 200, for example. Also, the omnidirectional camera 144 may be used to monitor a wide range of the farmland 200 in order to watch for animals such as crows and wild boars that may damage or destroy the farmland 200, for example.

The monitoring apparatus 14 includes a solar panel 142 having a plurality of solar batteries 33 arranged side by side and connected to each other for converting solar energy into electric energy, a control unit 147, a wireless antenna 141 for establishing wireless communication with the server 11 that is connected to the control unit 147, a transparent cover 143 for protecting the omnidirectional camera 144 and the like from the surrounding environment, and a pillar 146 for holding the monitoring apparatus 14 at a high position. Further, an LED or the like may be arranged to illuminate the surrounding of the monitoring apparatus 14.

Note that in FIG. 3A, the omnidirectional camera 144 is connected to a USB host 1401; however, the omnidirectional camera 144 may alternatively be connected by a wireless LAN, for example. Also, in some embodiments, a multi-spectral camera (described below) and/or a stereo camera may be provided in addition to or instead of the omnidirectional camera 144.

Also, various sensors are connected to the monitoring apparatus 14. Specific examples of the sensors connected to the monitoring apparatus 14 include the temperature sensor 1402, a relative humidity sensor 1403, a $CO_2$ concentration sensor 1404, an airflow (wind) sensor 1405, a soil temperature sensor 1406, a soil moisture sensor 1407, and a solar radiation (photosynthetic photon flux density) sensor 1408. The outputs of these sensors are constantly input to the server 11.

Note that the monitoring apparatus 14 may also act as an outdoor web server for remotely controlling an actuator 1409 such as an electromagnetic valve, and a servo mechanism 1410 that drives the sprinklers 22 of the irrigation apparatus 20 via an interface (e.g., RS232C) according to the monitoring results of the farmland 200 obtained by the sensors and the omnidirectional camera 144. Note that these control operations may be executed by the server 11 or the monitoring apparatus 14.

Also, the monitoring apparatus 14 includes a wireless communication unit (e.g., wireless LAN or mobile phone network) 148 that is connected to a network to establish communication with the server 11, or to create a hotspot, for example.

Note that various technologies are integrated in the monitoring apparatus 14. For example, the monitoring apparatus 14 implements a housing having high weather resistance, measurement technologies for flora and fauna and the environment, sensors that can be used for long periods of time, an air intake and exhaust system for taking in external air for measurement and internal cooling, network technology, and power generation technology using natural energy.

In the monitoring apparatus 14, devices such the omnidirectional camera 144 and the various sensors may be connected to the control unit 147 by the Ethernet (registered trademark), for example. The control unit 147 may correspond to a motherboard of a PC (personal computer) including an A/D (analog/digital) converter, a signal generation LSI (large-scale integration), a semiconductor relay, and a real time clock, for example.

The monitoring apparatus 14 uses various sensors such as the temperature sensor 1402, the relative humidity sensor 1403, the $CO_2$ concentration sensor 1404, the soil moisture sensor 1407, and the solar radiation (photosynthetic photon flux density) sensor 1408 to measure the temperature, the relative humidity, the $CO_2$ concentration, the soil moisture, and the amount of solar radiation, for example. The measured temperature, humidity, $CO_2$ concentration, soil moisture, and amount of solar radiation are converted into digital values by the A/D converter of the control unit 147. The outputs of the sensors that have been converted into digital values are transmitted to the server 11. The monitoring apparatus 14 may be configured to cool its internal electronic devices by forced ventilation, for example, and may be capable of obtaining highly accurate temperature and humidity measurements using an Assmann psychrometer, for example.

Also, the monitoring apparatus 14 may include a weighing-type rain gauge, a dust/pollen counter, a pest counter (e.g., counter for counting the number of pests of a specific type that have been attracted by a certain pheromone and killed by an electrical insect killer) as a counter sensor 1412, for example. The output values of these sensors are imported as digital data via an interface between the sensors and the control unit 147.

Also, the monitoring apparatus 14 includes a GPS device 1411 as a position sensor. As with the counting sensor 1412, the control unit 147 imports positional information obtained by the GPS device 1411 via the interface.

Also, the monitoring apparatus 14 uses the interface to control the actuator 1409 and the servo mechanism 1410. In this way, the shooting direction of the omnidirectional camera 144 may be controlled, and the actuator 1409 may be controlled to perform physical operations such as mechanically pressing switches, for example.

Power is supplied to the monitoring apparatus 14 by the solar batteries 33. The solar panel 142 is horizontally fixed to withstand strong winds and has multiple layers arranged in the vertical direction in order to increase the amount of power that can be obtained from a limited installation space. Note that in a case where the monitoring apparatus 14 is installed in an environment where there are drastic temperature changes, condensation may occur, and as such, measures for preventing condensation may be implemented such as activating an LED or some other device that can generate a large amount of heat in advance to a warm up the interior of the monitoring apparatus 14, for example.

Figure 4:
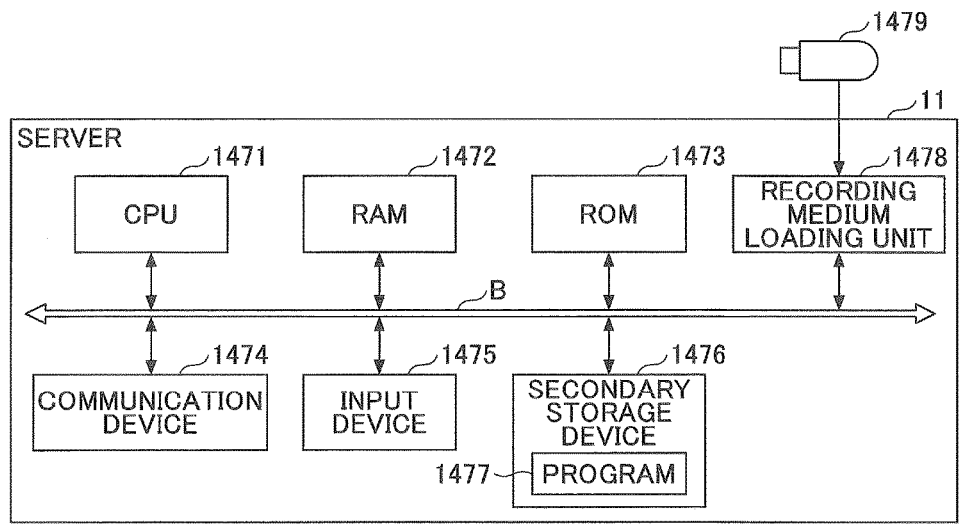
FIG. 4 illustrates an exemplary hardware configuration of a server.

FIG. 4 illustrates an exemplary hardware configuration of the server 11. The server 11 may have a general configuration of a PC including a CPU 1471, a RAM 1472, a ROM 1473, a communication device 1474, an input device 1475, a recording medium loading unit 1478, and a secondary storage device 1476 that are interconnected by a bus B, for example. The CPU 1471 implements various functions by reading an OS and programs from the secondary storage device 1476 and executing the OS and the programs, for example.

The RAM 1472 is used as a working memory (main memory) for temporarily storing data required by the CPU 1471 when executing a program. The ROM 1473 stores BIOS (Basic Input Output System) or some other program for starting the OS, for example.

The input device 1475 may include a keyboard and/or a touch panel for accepting an operation instruction from a user without using a network, for example.

A program 1477 for implementing one or more functions provided by the server 11 is stored in the secondary storage device 1476. Note that the secondary storage device 1476 is a nonvolatile memory such as a HDD (Hard Disk Drive) or SSD (Solid State Drive), for example.

The communication device 1474 is a NIC (Network Interface Card) such as an Ethernet card that is used to establish connection with a network.

A recording medium 1479 may be detachably installed in the recording medium loading unit 1478. The recording medium 1479 may be, for example, a USB memory, an SD memory, a CD, a DVD, a BD, or the like. The program 1477 may be stored in the recording medium 1479 and distributed in such a state, or the program 1477 may be downloaded from a server that distributes programs, for example.

Note that the control unit 147 of the monitoring apparatus 14 may have a hardware configuration that is substantially similar to the hardware configuration of the server 11.

Figure 5:
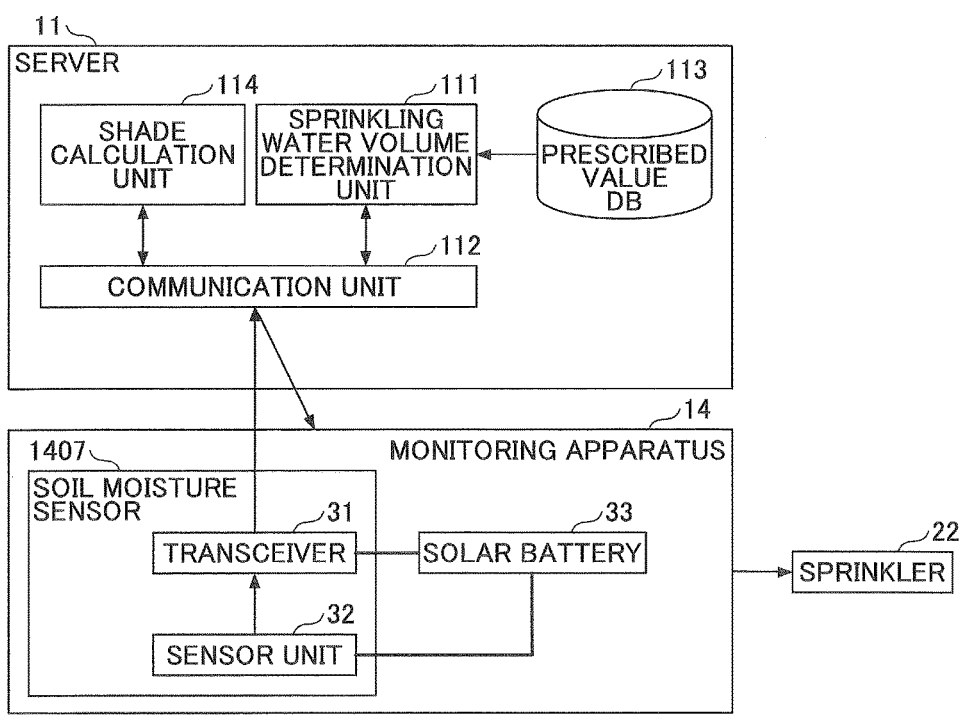
FIG. 5 illustrates an exemplary functional configuration of the farmland management system.

FIG. 5 is a block diagram illustrating an exemplary functional configuration of the farmland management system 100. In FIG. 5, the server 11 includes a sprinkling water volume determination unit 111, a shade calculation unit 114, a communication unit 112, and a prescribed value DB 113. The above functional units may be implemented by the CPU 1471 executing the program 147 in cooperation with hardware.

The sprinkling water volume determination unit 111 determines the amount of water to be sprinkled (sprinkling water volume) by comparing a moisture content detection signal from the soil moisture sensor 1407 with a prescribed value stored in the prescribed value DB 113. The determined sprinkling water volume is converted into an operation time of the sprinkler 22, and the converted operation time is transmitted to the monitoring apparatus 14 via the communication unit 112. Upon sprinkling water, the monitoring apparatus 14 controls the sprinkler 22 according to the operation time.

The shade calculation unit 114 captures an image of a shaded area from a captured image of the farmland 200.

The soil moisture sensor 1407 includes a transceiver 31 and a sensor unit 32. The soil moisture sensor 1407 is driven by the solar battery 33, and a detection signal of the moisture content detected by the sensor unit 32 is transmitted to the server 11 via the transceiver 31.

<Irrigation Control by Farmland Management System>

Figure 6:
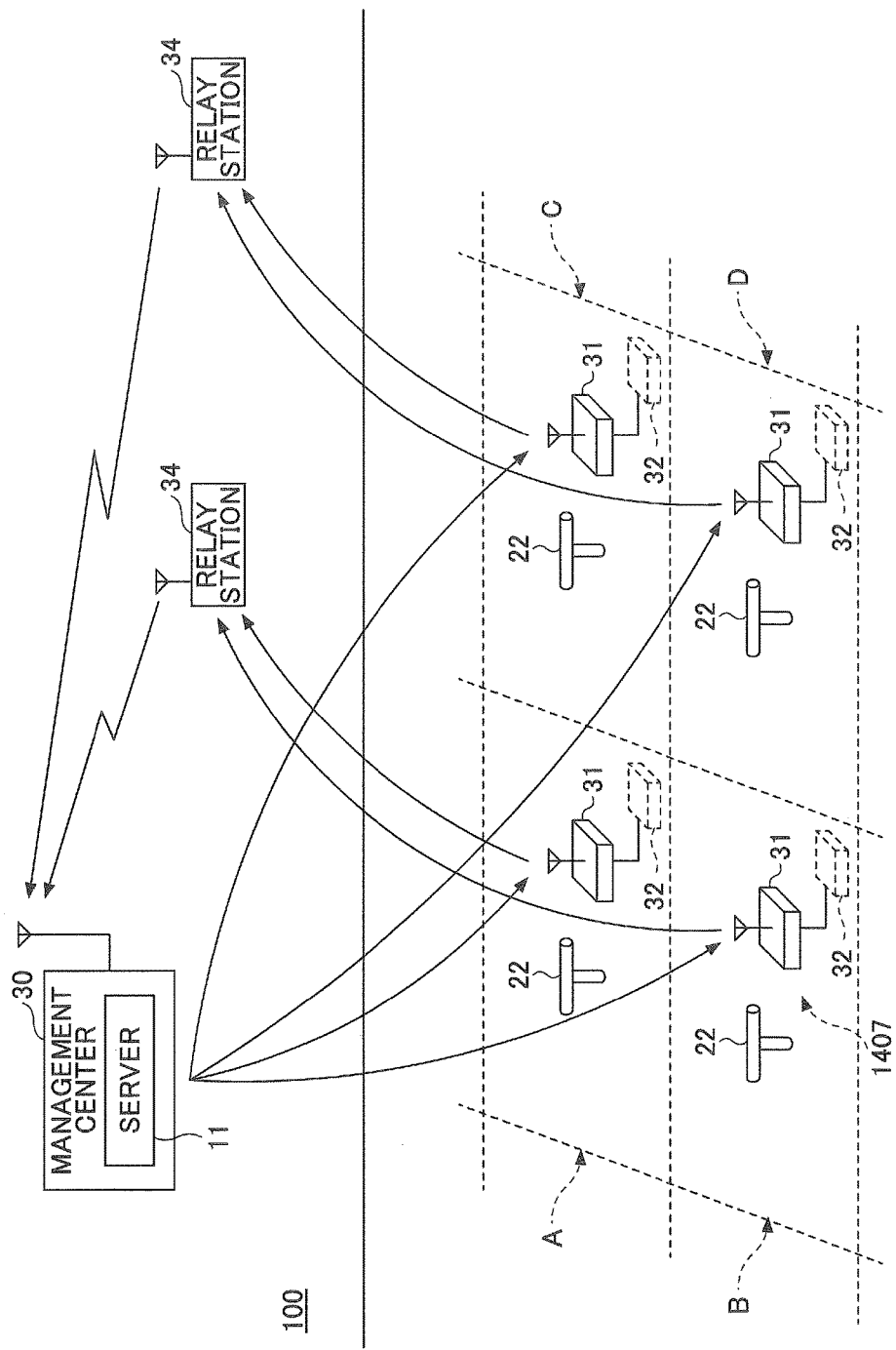
FIG. 6 illustrates exemplary irrigation control operations implemented by the farmland management system.
Figure 7:
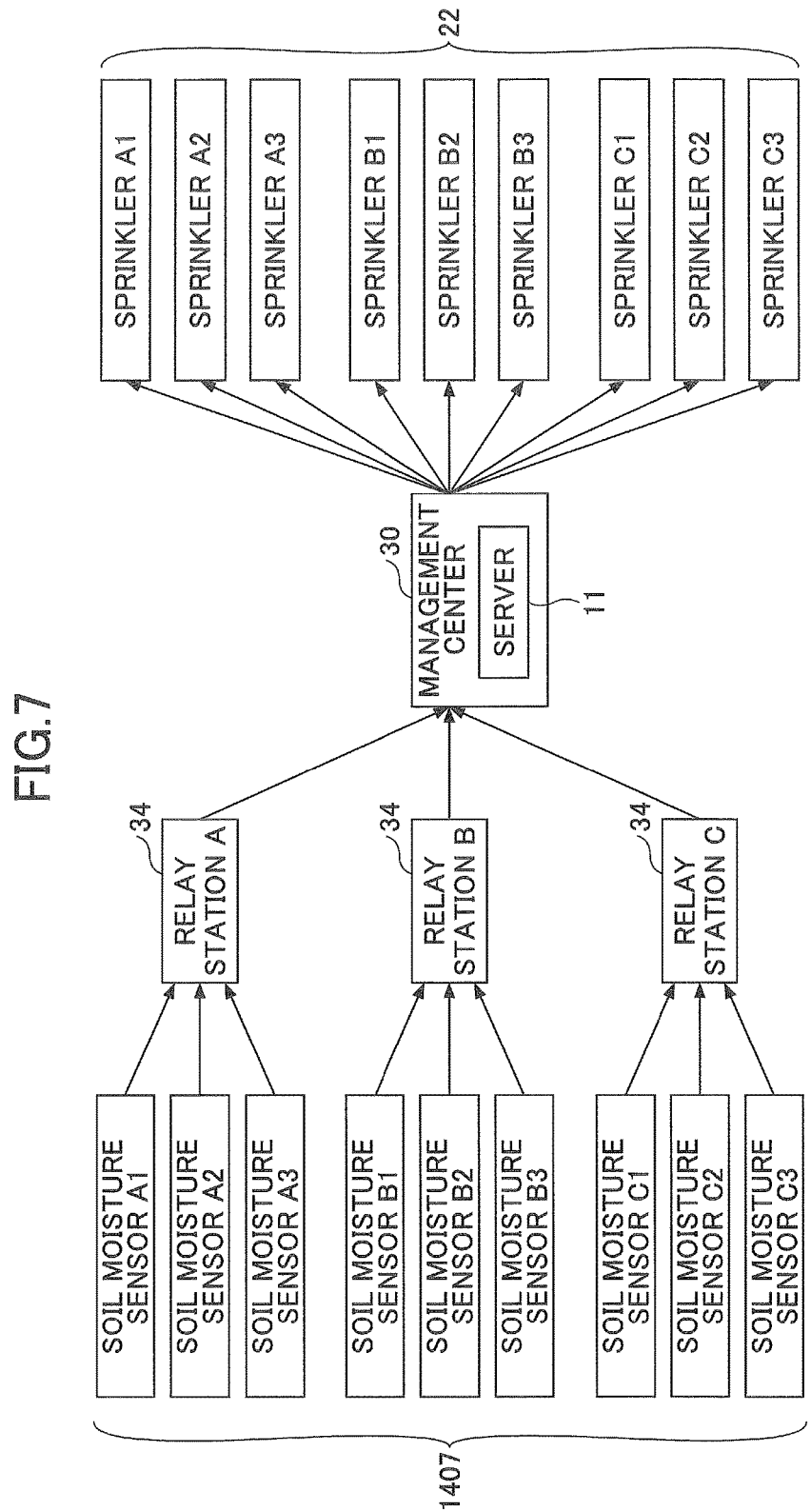
FIG. 7 illustrates exemplary communication paths of the farmland management system.

FIG. 6 illustrates exemplary irrigation control operations implemented by the farmland management system 100. FIG. 7 illustrates exemplary communication paths of the farmland management system 100.

In the present example, an area that is to be irrigated is divided into multiple areas (A, B, C, D . . . ), and the sprinkler 22 is provided in each area. The soil moisture sensor 1407 for measuring the moisture content of the soil is buried in each area, and each soil moisture sensor 1407 has the transceiver 31 arranged on the ground and connected to the sensor unit 32 by a cable.

The transceiver 31 includes a solar battery that acts as a power source for the soil moisture sensor 1407 and the transceiver 31 and an antenna for establishing communication with a relay station 34, which is described below. As illustrated in FIG. 7, a moisture content detection signal is transmitted from the transceiver 31 of each area to the relay station 34, which is provided with respect to each of a plurality of areas. The relay station 34 transfers the received moisture content detection signal to the server 11 that is installed in a management center 30. Note that an antenna for establishing wireless communication is installed in each of the relay stations 34 and the management center 30. Also, note that the moisture content detection signal does not necessarily have to be transmitted via the relay station 34, and in some cases, the moisture content detection signal may be directly transmitted to the management center 30.

Also, a plurality of soil moisture sensors 1407 may be buried within one area. In this case, the plurality of soil moisture sensors 1407 buried in each area may be wirelessly connected to the relay station 34 for the corresponding area via the transceiver 31, and each relay station 34 may be wirelessly connected to the management center 30. Also, at least one sprinkler 22 is provided in each area, and the monitoring apparatus 14 controls the sprinkler 22 to irrigate the soil of each area according to a corresponding irrigation command signal from the server 11.

Note that the soil moisture sensor 1407 may have the following structure as an example. That is, a tungsten lamp acting as a light emitting element and a silicon photodiode and a pyroelectric element acting as a pair of light receiving elements are arranged inside a sealed casing and are each directed toward a light transmitting member that is fixed to an opening formed at one surface of a housing that constitutes the sealed casing. Note that the light transmitting member is capable of transmitting light having a wide range of wavelengths including wavelengths in the visible light region and the near infrared light region.

Output signals of the silicon photodiode and the pyroelectric element of the soil moisture sensor 1407 are supplied to a control circuit of the transceiver 31 as moisture content detection signals. The control circuit wirelessly transmits the moisture content detection signals from an antenna to the relay station 34 via a wireless circuit. The relay station 34 transfers the received moisture content detection signals to the management center 30.

An irrigation command signal that is wirelessly transmitted from the management center 30 to the monitoring apparatus 14 is received by the wireless communication unit 148 via an antenna and is supplied to the control unit 147. Based on the irrigation command signal, the control unit 147 controls a solenoid valve connected to the sprinkler 22 to set up a water sprinkling volume to an optimum setting (appropriate sprinkling water volume). Note that in some embodiments, the management center 30 may transmit the irrigation command signal to the irrigation apparatus 20, for example.

The server 11 installed in the management center 30 calculates the moisture content of the soil in each area based on the moisture content detection signal for each area that is transferred from the relay station 34 in the manner described above. Further, by analyzing the above calculation result for each area in conjunction with the type of crop grown in each area and the extent of growth of the crop, the server 11 may determine the irrigation necessity of each area and the amount of water to be sprinkled in each area, for example.

Figure 8:
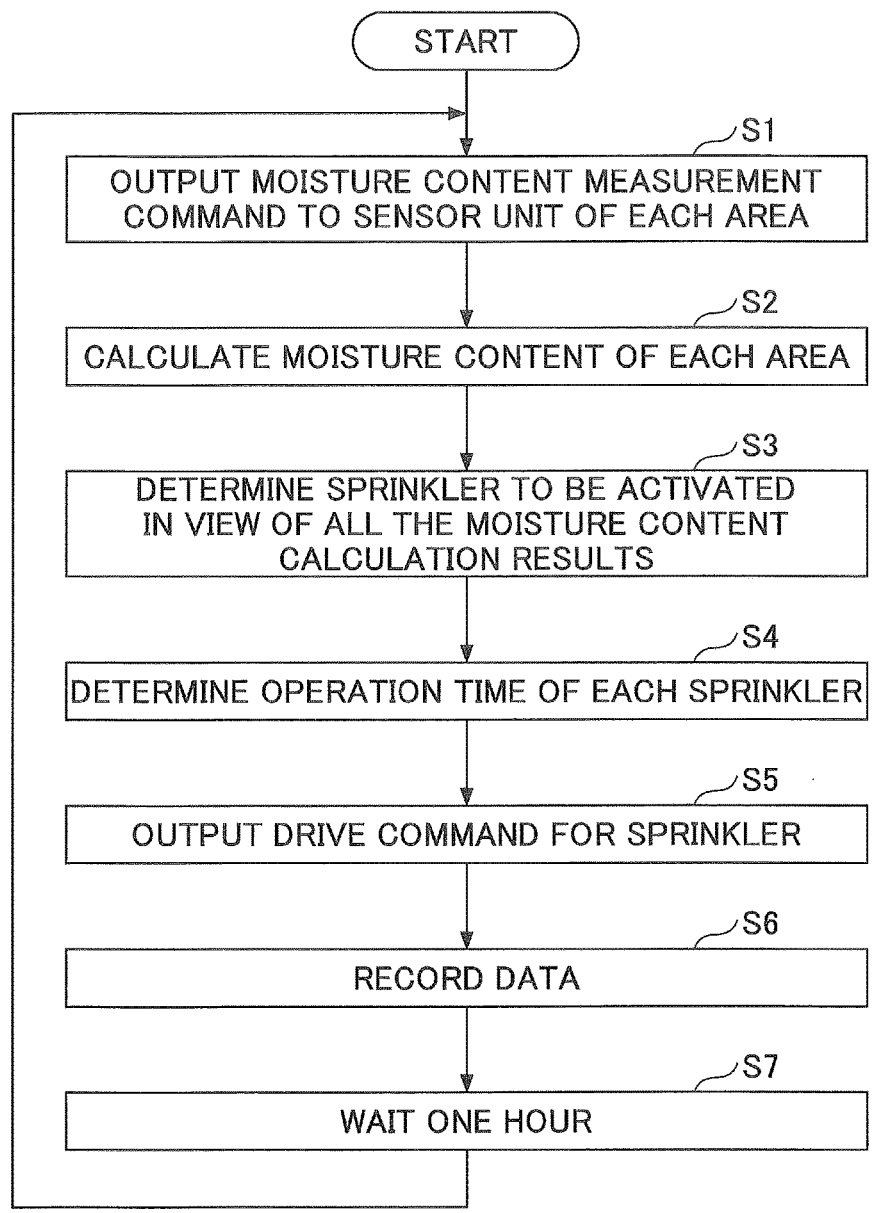
FIG. 8 is a flowchart illustrating soil irrigation control operations implemented by a server of a management center.

FIG. 8 is a flowchart illustrating exemplary soil irrigation control operations implemented by the server 11 of the management center 30.

First, the server 11 outputs a moisture content measurement command to the soil moisture sensor 1407 of each area (step S1).

Next, the server 11 calculates the moisture content of each area based on the moisture content detection signal transmitted from the soil moisture sensor 1407 of each area via the relay station 34 (step S2). Note that in a case where a plurality of soil moisture sensors 1407 are buried in each area, the moisture content of a corresponding area may be calculated based on a representative value such as the average value, the maximum value, or the minimum value of the moisture content detection signals from the plurality of soil moisture sensors 1407 buried in the corresponding area, for example.

Then, the sprinkling water volume determination unit 111 of the server 11 determines the irrigation necessity and the amount of water to be sprinkled (sprinkling water volume) for each area in consideration of the calculated moisture content of each area, and determines the one or more sprinklers 22 to be driven from among the plurality of sprinklers 22 arranged in the farmland 200 based on the above determination results (step S3). Note that the irrigation necessity of each area may be determined by comparing the measured moisture content with a prescribed value, for example. The prescribed value may be registered in a predetermined table according to various factors such as the type of crop grown in the area, the growth stage, the season, and the soil quality, for example.

Then, the sprinkling water volume determination unit 111 of the server 11 determines the operation time of each of the sprinklers 22 that are to be driven based on the sprinkling water volume (step S4). The relationship between the sprinkling water volume and the operation time is set up in advance.

Then, the server 11 outputs drive commands to the sprinklers 22 that need to be driven (step S5).

The server 11 records data such as the areas that were subject to water sprinkling, the sprinkling water volume, and the water sprinkling date/time (step S6). By keeping a detailed account of irrigation control and associating such data with subsequent outcomes such as the quality, the speed of growth, and the yield of crops, for example, data on the relationship between irrigation control and the quality and yield of crops may be accumulated.

Then, after waiting for a predetermined time (e.g., 1 hour), the process returns to step S1, and repeats the measurement of the moisture content of each area (step S7).

<Growth Measurement by Moving Object>

In the following, measurement of the growth of crops is described. In the present embodiment, a case of measuring the growth of a crop by a moving object is described as an example.

Figure 9:
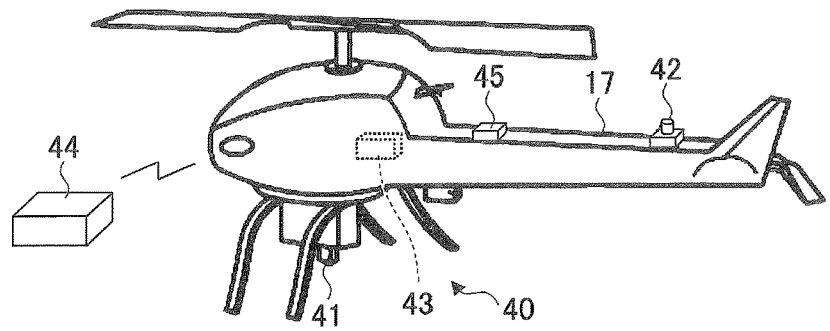
FIG. 9 is an external view of a moving object having a growth measuring apparatus installed therein.

FIG. 9 is an external view of a moving object 17 having a growth measuring apparatus 40 installed therein. The moving object 17 is remotely operated by a controller unit 44 by radio waves. Note that a helicopter is illustrated as the moving object 17 in the present example. A first light receiving unit 41 is arranged at a bottom section of the fuselage of the helicopter. The first light receiving unit 41 receives sunlight reflected from the farmland 200 cultivating rice, for example. The first light receiving unit 41 is installed in the helicopter via a suspension part that is arranged at the fuselage bottom section. The suspension part controls the orientation of the first light receiving unit 41 such that it is always turned vertically downward. The suspension part may be a conventional orientation adjustment mechanism that uses an actuator to electrically control the first light receiving unit 41 to be oriented vertically downward, for example.

A second light receiving unit 42 is oriented upward and is fixed to a tail portion of the helicopter. The second light receiving unit 42 directly receives sunlight. The second light receiving unit 42 is arranged toward the end of the tail portion of the helicopter outside the rotational center of a rotor so as not to interfere with sunlight reception. Note that the second light receiving unit 42 may be fixed to the tail portion via an orientation control mechanism similar to the suspension part as described above, for example, such that the second light receiving unit 42 may always be oriented vertically upward.

The growth measuring apparatus 40 includes the first light receiving unit 41, the second light receiving unit 42, and an operation control unit 43 that is connected to these light receiving units. The operation control unit 43 controls the first light receiving unit 41 and the second light receiving unit 42, and also executes a predetermined calculation based on light intensities detected by the first light receiving unit 41 and the second light receiving unit 42.

In FIG. 9, the operation control unit 43 is arranged within the fuselage as an illustrative example. However, the operation control unit 43 may be installed in any suitable location in accordance with the aircraft design. Note that the helicopter illustrated in FIG. 9 includes a GPS device 45 as a positional information acquisition unit such that the position of the helicopter may be confirmed. The positional information detected by the GPS device 45 may be supplied to the operation control unit 43.

Figure 10A:
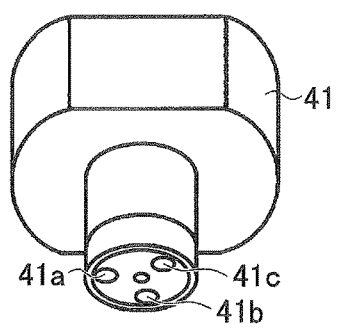
FIGS. 10A and 10B illustrate examples of light-receiving units of the growth measuring apparatus.
Figure 10B:
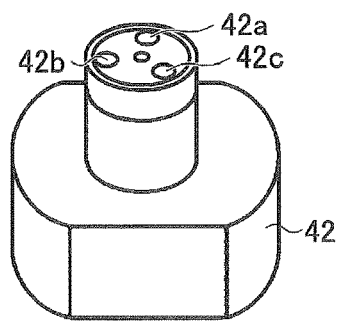

FIGS. 10A and 10B illustrate examples of the light receiving units of the growth measuring apparatus 40. FIG. 10A is a perspective view of the first light receiving unit 41 that is arranged at the helicopter fuselage facing downward, and FIG. 10B is a perspective view of the second light receiving unit 42 that is arranged at the tail portion of the helicopter facing upward.

First, the first light receiving unit 41 is described in greater detail below. The first light receiving unit 41 is disposed in a downward position facing the farmland 200 in order to receive sunlight reflected from the rice grown on the farmland 200, for example. The first light receiving unit 41 is different from a digital camera or the like that captures an image of the farmland 200 with a plurality of pixels. That is, the first light receiving unit 41 receives the entire light reflected from the entire group of plants (e.g., rice) grown in the farmland 200 (corresponding to a light receiving range) rather than dividing the reflected light into a plurality of pixels. The first light receiving unit 41 detects the light intensity of the sunlight that is reflected from the entire group of plants grown in the farmland 200 subject to measurement. The first light receiving unit 41 includes a plurality of light receiving elements for receiving light at specific wavelengths. For example, the first light receiving unit 41 may include a light receiving element 41a for receiving red light (e.g., wavelength of 650 nm), a light receiving element 41b for receiving near infrared light (e.g., wavelength of 850 nm), and a light receiving element 41c for receiving green light (e.g., wavelength of 550 nm). Note that the light receiving elements are not limited to the above example, and any known light receiving element may be used. For example, in some embodiments, a Si photodiode or a spectrometer may be used as the light receiving element. Also, a spectral filter is mounted on the light receiving surface of each of the light receiving elements in order to separate incident light into red light, near-infrared light, and green light, for example.

The second light receiving unit 42 is arranged in an upward position so as to directly receive sunlight. The second light receiving unit 42 is configured to receive light of the same specific wavelengths as the first light receiving unit 41. That is, like the first light receiving unit 41, the second light receiving unit 42 includes a light receiving element 42a for receiving light in the red region, a light receiving element 42b for receiving light in the near infrared light region, and a light receiving element 42c for receiving light in the green region, and a spectral filter is mounted on the light receiving surface of each of the light receiving elements. In some embodiments, a diffuser plate may be attached to the front surface of each spectral filter in order to avoid the influence of the incident angle of sunlight. The diffuser plate may also be arranged at each spectral filter of the first light receiving unit 41.

Figure 11:
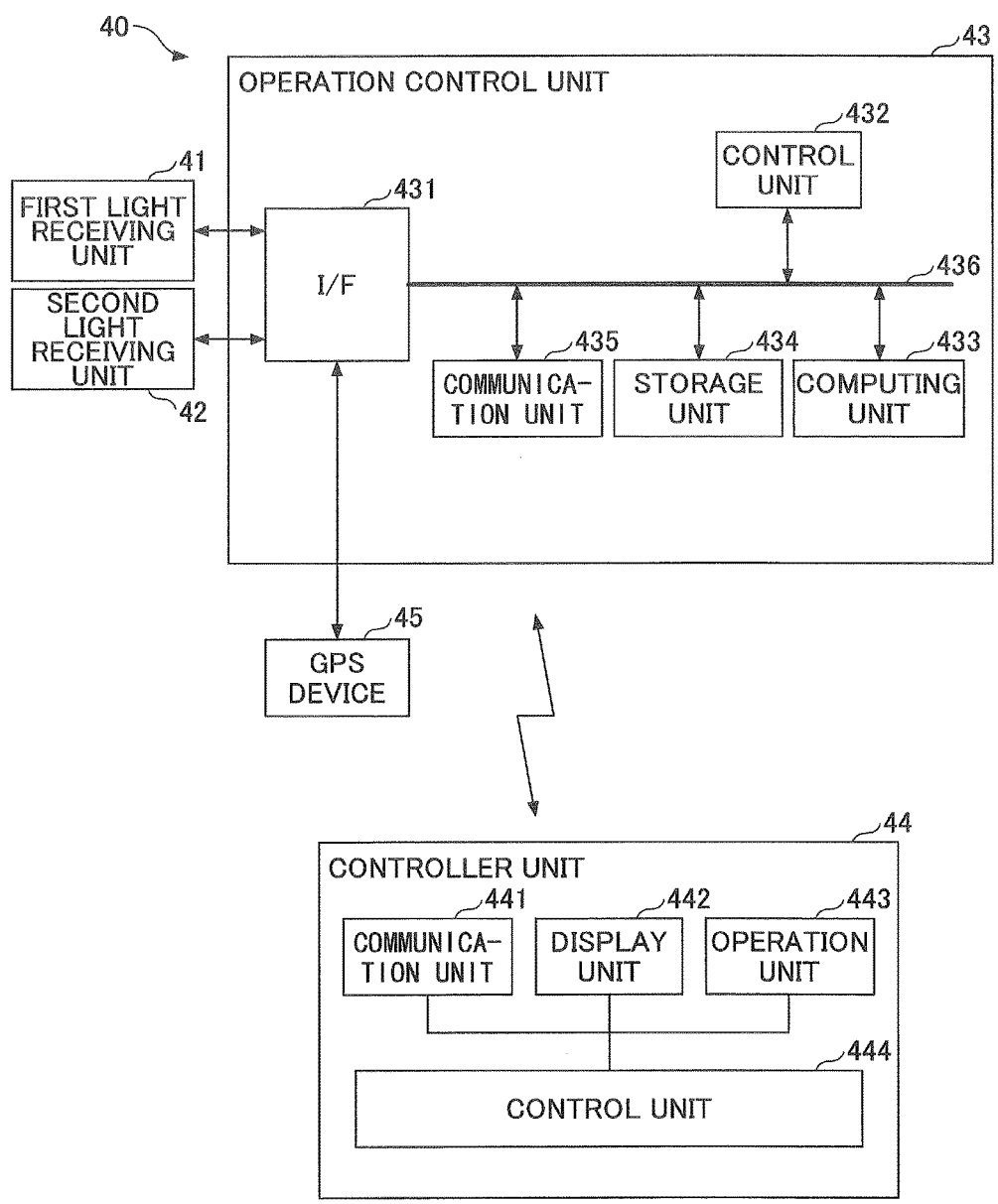
FIG. 11 illustrates exemplary functional configurations of the growth measuring apparatus and a controller unit for remotely operating the growth measuring apparatus via radio waves.

FIG. 11 is a block diagram illustrating functional configurations of the growth measuring apparatus 40 and the controller unit 44 for remotely operating the growth measuring apparatus 40 using radio waves. The operation control unit 43 of the growth measuring apparatus 40 may be operated from a remote location by an operator operating the controller unit 44. The controller unit 44 includes an operation unit 443 for enabling the operator to input a command, a display unit 442 for displaying an image, and a communication unit 441 for establishing bidirectional communication with the growth measuring apparatus 40. These units are controlled by a control unit 444.

The operation control unit 43 is connected to the first light receiving unit 41 and the second light receiving unit 42 via an I/F (interface unit) 431. The operation control unit 43 further includes a communication unit 435 that exchanges signals with the controller unit 44, a storage unit 434, a computing unit 433, and a control unit 432 for controlling the overall operations of the above units. These units are interconnected via a bus 436.

The control unit 432 is a microcomputer including a microprocessor as a central processing unit (CPU), for example. The storage unit 434 may be configured by an electrically rewritable memory such as a SSD or a HDD, for example. The storage unit 434 may store a program for driving the control unit 432 and series of data relating to growth indices, for example. Note that the GPS device 45 that is installed in the moving object 17 is also connected to the growth measuring apparatus 40 via the interface unit 431.

In this way, the control unit 432 is able to create a growth index map including positional information of the farmland 200. Growth data relating to growth indices of each farmland may also be stored in the storage unit 434. The control unit 432 controls the computing unit 433 to calculate growth indices, which are described below, based on the light intensities measured by the first light receiving unit 41 and the second light receiving unit 42. The control unit 432 reads a program for calculating the growth indices from the storage unit 434 and controls the computing unit 433 to calculate the growth indices.

The computing unit 433 calculates a reflectance R corresponding to a ratio of a measurement value for light in the red region measured by the first light receiving unit 41 with respect to a measurement value for light in the red region measured by the second light receiving unit 42. Similarly, the computing unit 433 calculates a reflectance NIR corresponding to a ratio of a measurement value for near infrared light (light in the near infrared region) measured by the first light receiving unit 41 with respect to measurement value for the near infrared light measured by the second light receiving unit 42. Further, the computing unit 433 calculates a first growth index I and a second growth index II by including the reflectance R and the reflectance NIR in the following formulas. The first growth index I is calculated based on the following formula (1):

$$\text{Growth Index } I = (NIR - R)/(NIR + R) \quad (1)$$

The first growth index I corresponds to the so-called normalized difference vegetation index (NDVI), which is a growth index that has a high correlation with the nitrogen content of the stems and leaves of a plant.

The second growth index II is calculated based on the following formula (2):

$$\text{Growth Index } II = \{(NIR-R)/(NIR+R)\} / \sqrt{\{(1-NIR)^2 + R^2\}} \quad (2)$$

The second growth index II is obtained by dividing the normalized difference vegetation index (NDVI) by $\sqrt{\{(1-NIR)^2+R^2\}}$. The growth indices I and II are described in detail below.

<Irrigation Control Using PRI>

In the following, a multispectral camera 450 is described with reference to FIGS. 12-17. Note that the multispectral camera 450 may be included in the monitoring apparatus 14 instead of or in addition to the omnidirectional camera 144, for example.

Figure 12A:
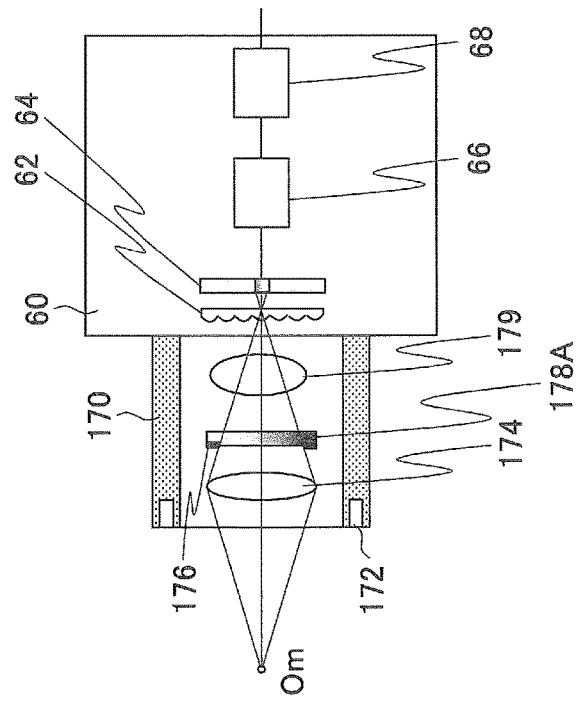
FIGS. 12A and 12B illustrate an exemplary configuration of a multispectral camera.
Figure 12B:
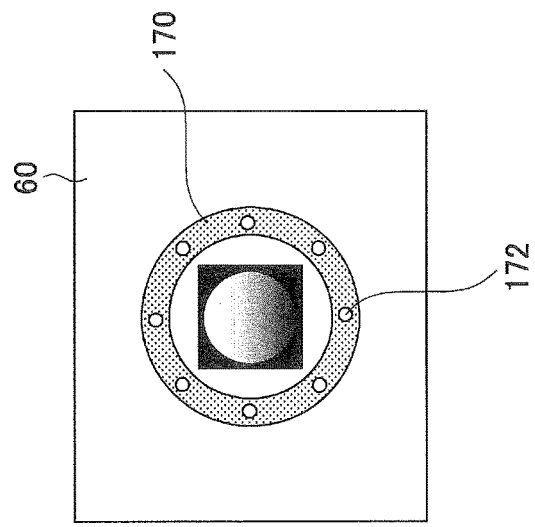

FIGS. 12A and 12B illustrate an exemplary configuration of the multispectral camera 450. FIG. 12A is a front view, and FIG. 12B is a cross-sectional side view of the multispectral camera 450. The multispectral camera 450 includes a body 60 having a micro-lens array 62, a light receiving element array 64, a field-programmable gate array (FPGA) 66, and a spectral reflectance calculating unit 68 arranged therein. The multispectral camera 450 also includes a tube 170 having light emitting diodes (LEDs) 172, a main lens 174, a diaphragm 176, a filter 178A, and a condenser lens 179 arranged therein.

The micro-lens array 62 is an optical element having a plurality of small lenses arranged in two-dimensional directions. The light receiving element array 64 has a plurality of light receiving elements and is a monochrome sensor that does not have a color filter arranged for each light receiving element (hereinafter also referred to as "pixel"). The light receiving element array 64 is a sensor for converting optical information into electrical information. The FPGA 66 is a spectral image generation unit for generating a plurality of types of spectral images based on electrical information corresponding to spectral information output by the light receiving element array 64.

The spectral reflectance calculating unit 68 includes semiconductor elements such as a CPU, a ROM, and a RAM, and is configured to calculate a spectral reflectance of each pixel of the spectral images generated by the FPGA 66.

The multispectral camera 450 outputs the plurality of types of spectral images generated by the FPGA 66 and the spectral reflectance of each pixel of the spectral images. Such information may be transmitted to the server 11, for example.

The LED 172 is a light source, and multiple LEDs 172 are embedded at equal intervals around a front end portion of the tube 170. By using the LED as a light source, stable spectral information that is less susceptible to factors of the imaging environment may be obtained. The main lens 174 is a lens for guiding light reflected by an object Om to the filter 178A via the diaphragm 176. The diaphragm 176 is a shield that is used to adjust the passage of light. The filter 178A has a spectral transmittance that continuously changes spatially. That is, the filter 178A has a plurality of spectral characteristics. Note that the direction of continuity of the spectral transmittance of the filter 178A is not particularly limited as long as it is within one plane. For example, the continuity may be maintained within a plane perpendicular to the optical axis of the main lens 174 in a vertical direction of FIG. 12B, a direction orthogonal to the vertical direction, or a direction that diagonally intersects the vertical direction. The condenser lens 179 is a lens for guiding the light that has passed through the filter 178A to the micro-lens array 62.

Light reflected by the object Om that receives light irradiated from the LEDs 172 and other light is incident on the main lens 174. Such a light beam incident on the main lens 174 is subject to spectral reflectance measurements. The light beam incident on the main lens 174 is a set of numerous light rays, each light ray passing through different positions of the diaphragm 176. The reflected light is condensed by the main lens 174, and the amount of light may be adjusted by the diaphragm 176 before passing through the filter 178A. Note that although the diaphragm 176 is mounted on the filter 178A in the illustrated example, the present invention is not limited thereto. The light rays incident on the filter 178A pass through the filter 178A having differing spectral transmittances. The light rays that have passed through the filter 178A are condensed by the condenser lens 179 and temporarily form an image near the micro-lens array 62. Note that the micro-lens array 62 is arranged so that multiple micro-lenses (small lenses) are aligned in a direction perpendicular to the optical axis of the main lens 174. The light rays that have temporarily formed an image are diverged by the micro-lens array 62 to reach different positions of the light receiving element array 64. That is, the positions on the light receiving surface of the light receiving element array 64 correspond to the positions of the filter 178A through which the light rays have passed the filter 178A, and as such the spectral reflectance of a point of the object Om may be measured at the same time.

Figure 13:
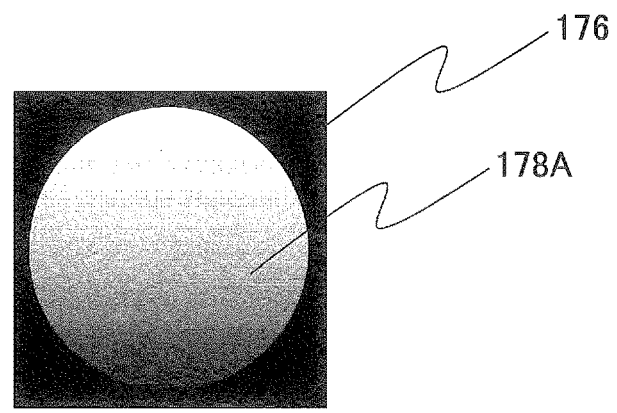
FIG. 13 is a front view of a filter and a diaphragm of the multispectral camera.
Figure 14:
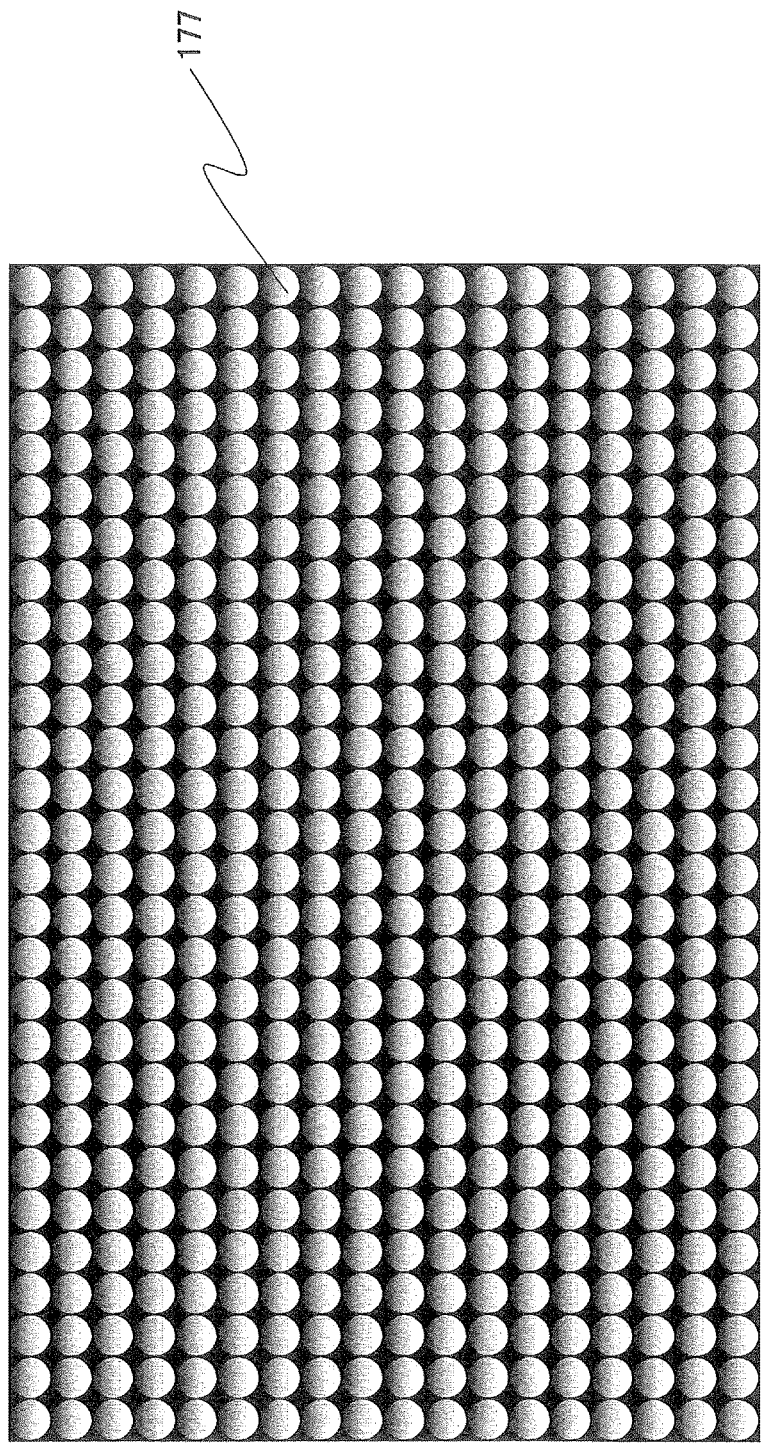
FIG. 14 illustrates an exemplary image captured by the multispectral camera.

FIG. 13 is a front view of the filter 178A and the diaphragm 176 that are used in the present embodiment. In FIG. 13, a lower portion of the filter 178A has a spectral transmittance peak at a short wavelength and an upper portion of the filter 178A has a spectral transmittance peak at a long wavelength. In this case, an image captured by the multispectral camera may consist of small circles aligned in a manner illustrated in FIG. 14, for example. Note that the small circles are formed because the diaphragm 176 of the main lens 174 has a circular aperture. In the following descriptions, each of the small circles is referred to as a "macro-pixel 177." Note that all of the macro-pixels 177 may be gathered to collectively form one image. Each macro-pixel 177 is formed right below a corresponding small lens (micro-lens) constituting the micro-lens array 62. The diameter of the macro-pixel 177 and the diameter of the micro-lens are substantially the same.

As illustrated in FIGS. 12A and 12B, light rays that have passed through the lower portion of the filter 178A reach an upper portion of the macro-pixel 177, and light rays that have passed through the upper portion of the filter 178A reach lower portion of the macro-pixel 177. That is, when the lower portion of the filter 178A is arranged to have a spectral transmittance at a short wavelength and the upper portion of the filter 178A is arranged to have a spectral transmittance at a long wavelength, light rays with a short wavelength reach the upper portion of the macro-pixel 177, and light rays with a long wavelength reach the lower portion of the macro-pixel 177. The FPGA 66 generates a plurality of spectral images based on spectral information of pixels formed by light rays of various wavelengths. In this way, a plurality of spectral images with respect to desired wavelengths can be obtained. The spectral reflectance calculating unit 68 may calculate the spectral reflectance of the pixels by calculating an average value of each row of the macro-pixels 177, and considering the spectral intensity of illumination by the LEDs 172, the spectral transmittance of the main lens 174 and the condenser lens 179, the spectral transmittance of the filter 178A, and the spectral sensitivity of the light receiving element array 64, for example.

Figure 15:
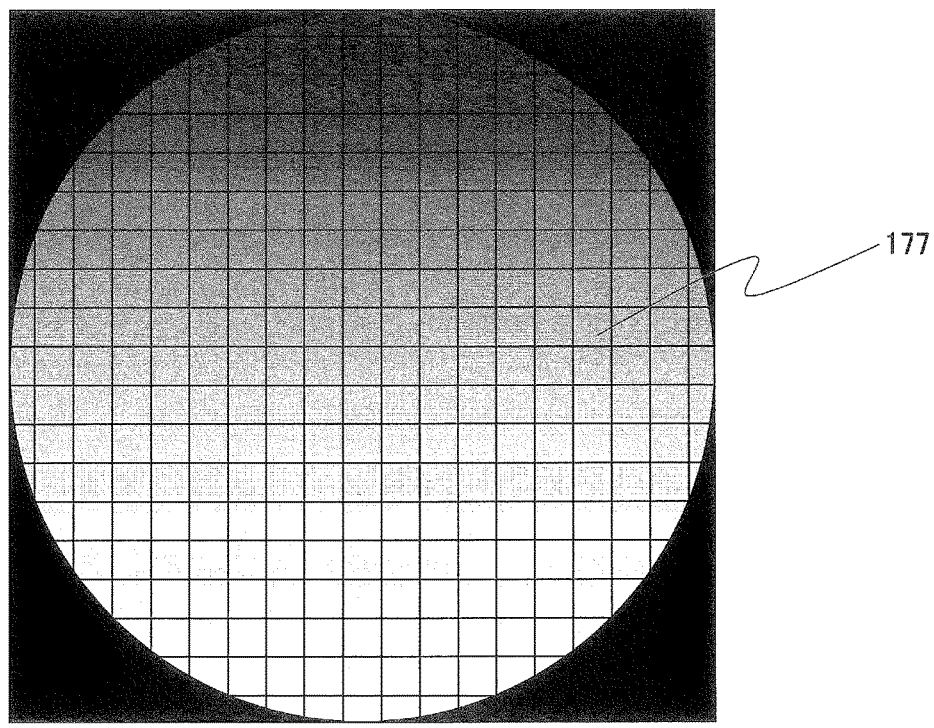
FIG. 15 an enlarged view of an exemplary macro-pixel.

FIG. 15 is an enlarged view of the macro-pixel 177. Here, an exemplary case where 19×19 pixels constitute one macro-pixel 177 is contemplated. The following descriptions relate to obtaining the spectral reflectance of a point of the object Om corresponding to a measuring object based on this one macro-pixel 177. First, procedures for obtaining the reflectance at a shortest wavelength (λs) are described. Note that data obtained from the multispectral camera 450 correspond to an output value of a light receiving element, and the output value corresponds to the amount of light incident on the light receiving element. The amount of light corresponds to the product of the values of five characteristics including the spectral intensity of the illumination by the LEDs 172 and the like, the spectral reflectance of the object Om, the spectral transmittance of the optical system (the main lens 174, the condenser lens 179, etc.), the spectral transmittance of the filter 178A, and the spectral sensitivity of the light receiving element array 64 at the wavelength λs. Therefore, to determine the reflectance of the object Om at the shortest wavelength λs, the output value may be divided by four values corresponding to the four characteristics other than the spectral reflectance of the object Om.

In the present example, a value obtained by dividing the sum of the output values of the 19 pixels of the lowermost row of the macro-pixel 177 illustrated in FIG. 15 by the area of the row forming the macro-pixel 177 is used as the output value. The area of the row forming the macro-pixel 177 refers to the area other than the portions indicated in black in FIG. 15, namely, an area that can be reached by the light rays. Note that the above calculation is implemented for the purpose of normalizing the output values of each row. A relative value of the reflectance at the shortest wavelength λs may be obtained by the above process. To obtain the absolute value of the reflectance, a separate calibration operation needs to be performed. Note that the spectral intensity of the illumination by the LEDs 172 and the like, the spectral transmittance of the main lens 174 and the condenser lens 179, the spectral transmittance of the filter 178A, the spectral sensitivity of the light receiving element array 64, and the area of each row forming the macro-pixel 177 are known at the time of design. Thus, by applying the above process to each row of the macro-pixel 177, the spectral reflectance with respect to 19 wavelengths may be obtained.

Figure 16:
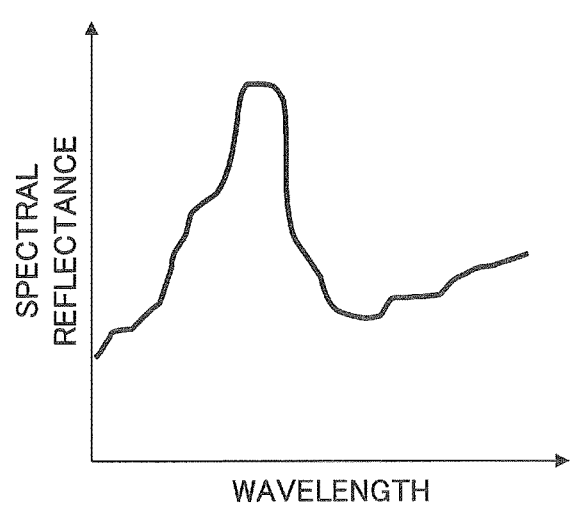
FIG. 16 is a graph representing exemplary measurement results of a reflectance.

FIG. 16 is a graph illustrating exemplary measurement results of the reflectance. In FIG. 16, the horizontal axis represents the wavelength and the vertical axis represents a relative value of the spectral reflectance. Note that the above process relates to obtaining measurements for one macro-pixel 177, and the same process may be applied to all the macro-pixels 177 to obtain two-dimensional spectral reflectance measurements. The filter 178A may be fabricated by depositing a thin film on a transparent substrate made of optical glass, for example, such that the thin film thickness varies to form a wedge profile. The material of the thin film in the present embodiment is a niobium pentoxide, the material of the short-wavelength side is tantalum pentoxide. The thickness of the thin film may be from several tens of nanometers (nm) to several hundreds of nanometers (nm). A portion of the filter 178A with a thinner film thickness corresponds to the short wavelength side, and the portion with the thicker film thickness corresponds to the long wavelength side. Because the thickness of the thin film changes to form a wedge profile (i.e., stepless profile), the spectral transmittance of the filter 178A also changes continuously.

Because the spectral transmittance is controlled by light interference, a condition in which transmitted light is constructively reinforced corresponds to the peak wavelength of spectral transmittance. The thickness of the transparent substrate is not particularly limited as long as it is capable of supporting the filter. In some cases, the lens is designed to be arranged in the vicinity of the diaphragm, and in such case, the transparent substrate is preferably arranged to be relatively thin. For example, the thickness may be about 0.5 mm. By utilizing the filter 178A having continuous spectral transmission characteristics as described above, a continuous spectral reflectance may be directly obtained at the same time as imaging. Thus, an estimation process may be unnecessary, and a two-dimensional spectral reflectance that is highly robust with respect to noise may be measured.

Figure 17B:
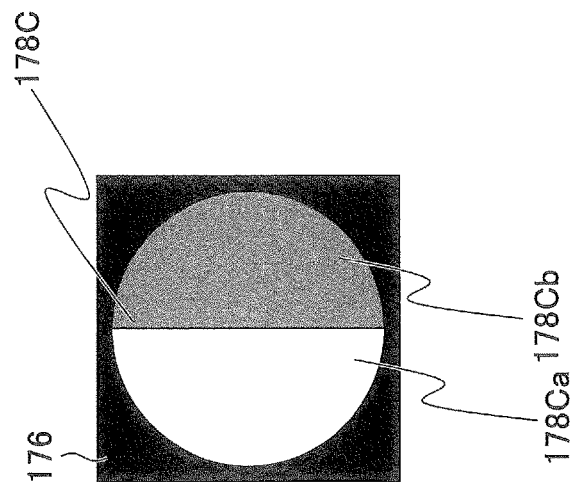
FIGS. 17A and 17B illustrate other examples of filters that may be used in the multispectral camera.
Figure 17A:
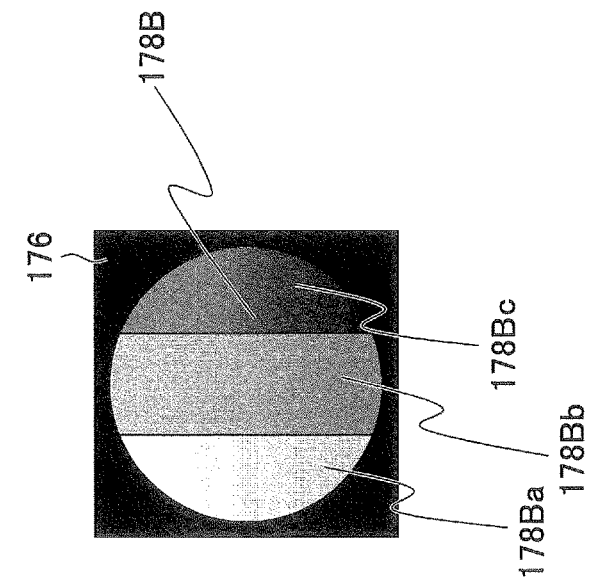

In the following, other examples of filters that may be used in the multispectral camera 450 of the present embodiment are described with reference to FIGS. 17A and 17B. FIG. 17A illustrates a filter 178B having a divided portions for each transmission band. That is, the filter 178B is composed of a filter 178Ba corresponding to a wavelength range from 400 nm to 500 nm, a filter 178Bb corresponding to a wavelength range from 500 nm to 600 nm, and a filter 178Bc corresponding to a wavelength range from 600 nm to 700 nm. Thus, the filter 178B is a filter that also has a spectral transmittance that changes continuously in the ultraviolet region or the infrared region. Each of the filters 178Ba, 178Bb, and 178Bc is a filter that has a spectral transmittance that continuously changes spatially. In the illustrated example, in each of the filters 178Ba, 178Bb, and 178Bc the transmitting wavelength increases from the top toward the bottom of the drawing. Note that orientations of the filters 178Ba, 178Bb, and 178Bc do not necessarily have to be uniform in the longitudinal direction. That is, as long as the filters include regions having a spectral transmittance that continuously changes, the directionality of the filters may be arbitrarily set up. Also, note that the configurations of the filters 178Ba, 178Bb, and 178Bc are not limited to the above illustrated configurations as long as each of the filters has at least a portion with varying wavelength ranges. Each of the above transmission bands is merely an example and the transmittance of the filter is not limited to these values. By dividing the filter as described above, the wavelength width corresponding to one pixel may be reduced. That is, spectral reflectance measurements with a higher wavelength resolution may be obtained. Also, by dividing the filter, continuity of the spectral transmittance may be secured within a narrower aperture diameter as compared to the case of using an elongated filter.

Note that to use light efficiently, the shape of the aperture of the diaphragm 176 may be arranged into a polygon such as a square or some other desirable shape, for example.

In the following, the PRI (Photochemical/Physiological Reflectance Index) is described. Although the NDVI is useful for stable cultivation control over a relatively long period because the NDVI is not susceptible to abrupt changes, it is not suitable as an index for monitoring the state of a plant and controlling cultivation over a short period. Thus, the so-called PRI may be effectively used in such a case. The PRI is calculated based on formula (3) indicated below. Note that R531 and R570 in the below formula (3) respectively represent the reflectance of wavelengths 531 nm and 570 nm.

$$PRI=(R531-R570)/(R531+R570) \quad (3)$$

Figure 18:
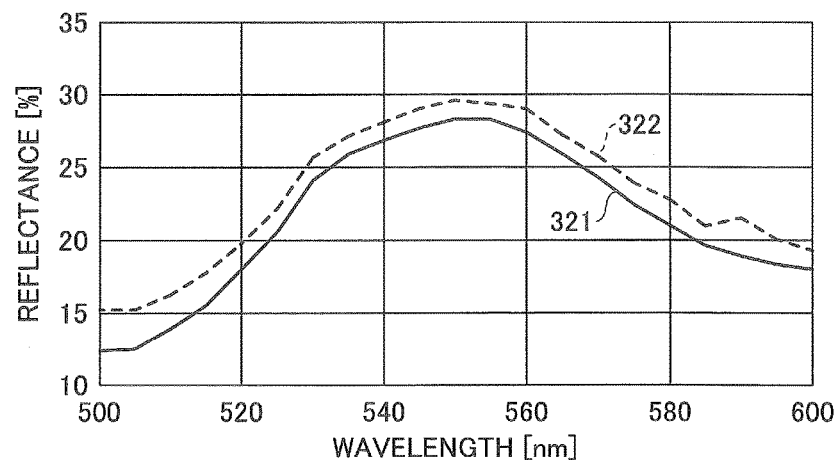
FIG. 18 is a graph illustrating a photochemical/physiological reflectance index (PRI)

FIG. 18 is an exemplary diagram for explaining the PRI. FIG. 18 shows the spectral reflectance spectra of plant leaves at wavelengths of 500-600 nm. The solid line 321 represents the spectral reflectance spectrum of the plant leaves that are not given water stress, and the dashed line 322 represents the spectral reflectance spectrum of the plant leaves that were given water stress. The spectral reflectance spectra of FIG. 18 represent typical spectral reflectance characteristics. That is, although the absolute values of the reflectance and the slope of the reflectance with respect to the wavelength may vary depending on the type of plant, the temperature, and the cultivation time, water stress has the effect of changing the reflectance to increase over a wide wavelength range. Such an effect may be attributed to a change in the property of the pigments of chloroplasts contained in the plant leaves that occurs when the plant is subjected to water stress, for example.

Such a change occurs in a relatively short time period of about 1 hour after water stress conditions are created, and as such, effective irrigation control may be enabled by monitoring changes in the reflectance. Further, the above-described PRI may be an effective index for monitoring such changes in the reflectance.

Also, the PRI is known to have a high positive correlation with photosynthesis (the greater the photosynthetic rate, the closer the PRI is to "1"). The photosynthetic rate of a plant is known to abruptly decrease when the plant is subjected to water stress and pores of the leaves are closed. Thus, the above relation between the photosynthetic rate and the PRI may also corroborate the notion that water stress can be quantitatively measured based on the PRI.

As described above, the multispectral camera 450 is capable of detecting the reflectance of wavelengths of 531 nm and 570 nm. In this case, a filter 178C including a filter 178Ca and a filter 178Cb as illustrated in FIG. 17B may be used, and a filter corresponding to a wavelength range of 531 nm may be used as the filter 178Ca, and a filter corresponding to a wavelength range of 570 nm may be used as the filter 178Cb. Note that theoretically, the PRI of the entire imaging area can be obtained.

Of the plurality of LEDs 172 provided in the multispectral camera 450, about half of the LEDs may have strong emissions at wavelengths around 531 nm, and the other half of the LEDs may have strong emissions at wavelengths around 570 nm. Using the LEDs 172 with such a configuration, the multispectral camera 450 illuminates LED light on a target plant subject to measurement and captures the light that is reflected by the target plant. Then, the FPGA 66 obtains a spectral image at the wavelength 531 nm and a spectral image at the wavelength 570 nm. The spectral reflectance calculating unit 68 obtains the spectral reflectance of a desired position or area of the spectral images. Also, the spectral reflectance calculating unit 68 calculates the PRI using the above formula (3). Note that in some embodiments, the FPGA 66 may calculate the PRI of each pixel based on the spectral images.

Note that in some embodiments, the server 11 that acquires the spectral images and the spectral reflectance information from the multispectral camera 450 may calculate the PRI using the above formula (3) instead of the multispectral camera 450. The PRI of each plant that has been calculated in the above-described manner is accumulated in the secondary storage device 1476.

As can be appreciated from the above formula (3), the PRI may take a value within a range from "−1" to "+1". However, in most cases, the PRI that is actually calculated based on the reflectance of plant leaves has a relatively small absolute value that is close to zero. Note that it is generally difficult for the server 11 to ascertain that a plant is not under water stress conditions or that a plant is under water stress conditions based on the value of the PRI. This is because the reflectance is influenced by factors such as the type of plant and the temperature, for example.

However, if a plant is grown in a stable growing environment such as a plant factory, the multispectral camera 450 may be able to measure the reflectance of reflected light of the plant being cultivated in advance under water-stress-controlled conditions. In this way, the server 11 may accumulate PRI information obtained over a certain time period with respect to a given plant that is measured under water-stress-controlled conditions. For example, information on the relationship between the amount of water supplied per unit time and the PRI may be accumulated in advance, and in this way, the relationship between water stress on a given plant and the PRI may be obtained in advance. Also, the level of water stress that is effective for cultivation of the plant may be determined based on post-harvest inspection and actual tasting, for example.

As described above, a favorable PRI value may be identified by referring to knowledge data that have been accumulated in advance. Accordingly, when the PRI value falls below a threshold (e.g., "0"), the server 11 may control the monitoring apparatus 14 to start irrigation, for example. Because the PRI value changes in a very short time of less than one hour in response to a change in the water stress conditions, the server 11 may be able to properly control irrigation by observing the PRI every few minutes, for example. By constructing such a PRI observation-irrigation control system, the farmland management system 100 may perform proper irrigation control for each plant.

Note that the NDVI may be used as an index for control over a relatively long period in view of cultivation conditions and harvesting time, for example, whereas the PRI is an index that enables control over a short period in response to water stress conditions. By using both of the above indices, the server 11 may be able to perform control throughout the entire cultivation period of a plant being cultivated to thereby achieve desirably high quality and high yield of the plant.

Figure 19:
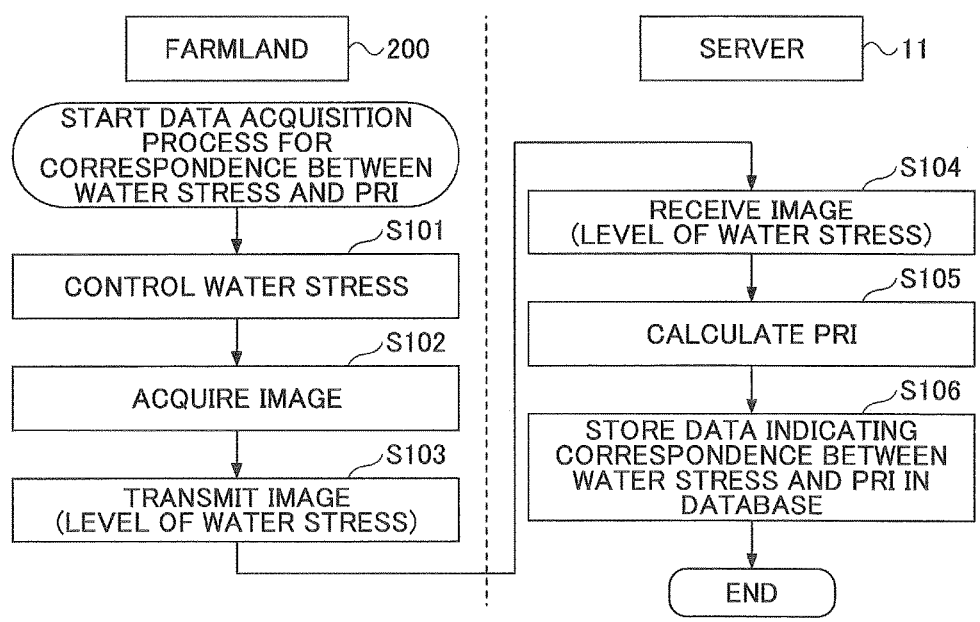
FIG. 19 is a flowchart illustrating a process in which the farmland management system acquires data representing a correspondence between water stress and the PRI.

FIG. 19 is a flowchart illustrating a process in which the farmland management system 100 acquires data indicating a correspondence between the water stress and the PRI. In the following descriptions, it is assumed that the server 11 calculates the PRI. However, in other examples, the monitoring apparatus 14 including the multispectral camera 450 may calculate the PRI.

First, the monitoring apparatus 14 of the farmland 200 controls the water stress according to control by the server 11 or operations by an administrator managing the plants (step S101). The water stress is preferably controllable over a wide range from sufficiently watered conditions to water-deficient conditions still tolerated in the crop cultivation process.

Then, the multispectral camera 450 acquires an image of the plant leaves (step S102). The image of the plant leaves is acquired while water stress is applied to the plant. A plurality of images of the plant leaves are preferably obtained such that the server 11 may be able to observe temporally stabilized effects of the water stress after the water stress has been applied.

Then, the multispectral camera 450 transmits the image acquired in step S102 to the server 11 (step S103). Also, in a case where the water stress control involves controlling the level of water stress to be applied as opposed to binary control of simply applying or not applying water stress, the multispectral camera 450 also transmits the level of water stress that is applied to the server 11.

Then, the server 11 receives the image (step S104), and the sprinkling water volume determination unit 111 of the server 11 calculates the PRI based on the above formula (3) (step S105).

The sprinkling water volume determination unit 111 of the server 11 stores the calculated PRI in the secondary storage device 1476 such that data representing the correspondence between the water stress and the PRI is accumulated in the secondary storage device 1476 (step S106). In this way, the relationship between the level of water stress applied to a given plant and the PRI may be stored in the secondary storage device 1476.

Figure 20A:
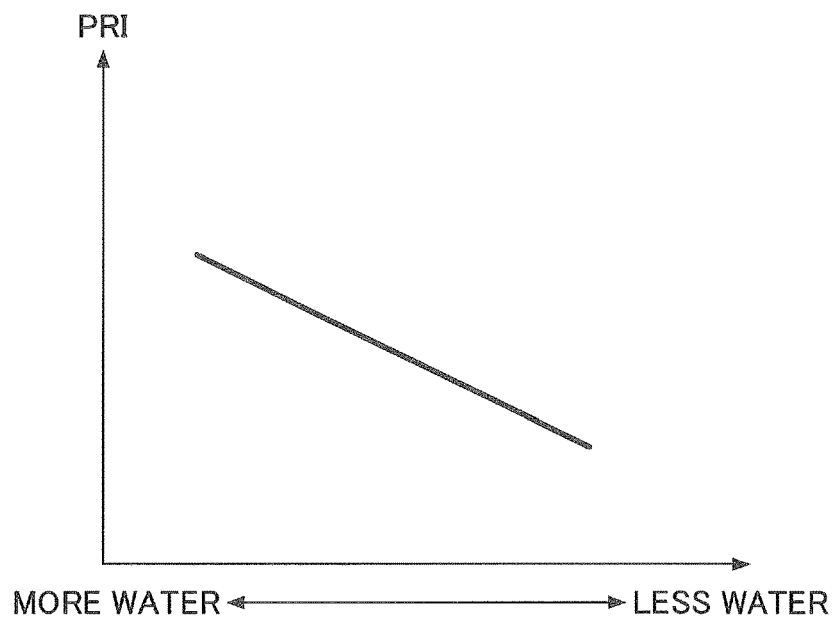
FIGS. 20A and 20B are graphs conceptually illustrating the relationship between the PRI and the level of water stress.

FIG. 20A is an exemplary conceptual diagram illustrating the relationship between the level of water stress and the PRI. Note that although FIG. 20A illustrates a case where the PRI is downwardly-sloped to decrease as the water stress increases (as water is reduced), the PRI may alternatively be upwardly-sloped, or the PRI does not necessarily have to change evenly, for example.

The level of water stress that is favorable for a plant can be determined based on knowledge of persons experienced in farming and/or knowledge obtained from post-harvest inspection and actual tasting, for example. Thus, based on such knowledge, a favorable PRI may be determined from FIG. 20A.

Note, however, that the favorable water stress may vary depending on the specific cultivation time of the plant. Thus, in a preferred embodiment, the server 11 periodically acquires the relationship between the level of water stress and the PRI over the cultivation time of the plant (e.g., every ten days, or once a month). In this way, information on the favorable PRI may be accumulated over the entire cultivation time of the plant.

Figure 20B:
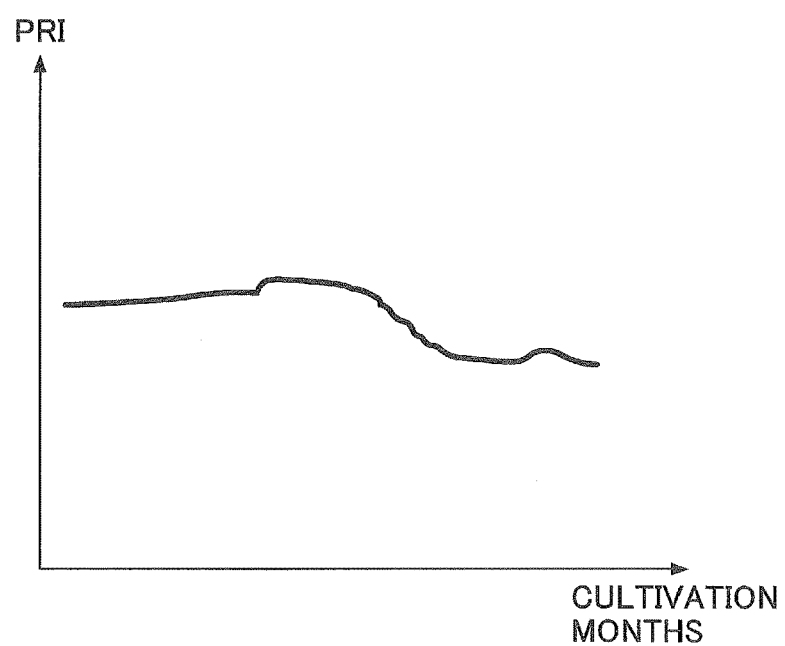

FIG. 20B is an exemplary conceptual diagram illustrating the relationship between the cultivation time (months) and the favorable PRI. According to FIG. 20B, water stress corresponding to a relatively high PRI is preferably applied to the plant during the first half of the cultivation time of the plant, and water stress corresponding to a relatively low PRI is preferably applied to the plant during the latter half of the cultivation time. Such water stress control may be referred to as "draining". For example, "draining" is used as a technique for increasing the sugar content of a fruit by intentionally placing the plant under water-deficient conditions before harvesting the fruit. By registering a PRI value corresponding to such water-deficient conditions in the secondary storage device 1476 as the favorable PRI at a predetermined cultivation time, the server 11 may automatically implement such draining at the predetermined cultivation time. That is, by storing knowledge data such as that illustrated in FIG. 20B in the secondary storage device 1476, the server 11 may be able to deliberately create favorable water stress conditions based on the favorable PRI.

Figure 21:
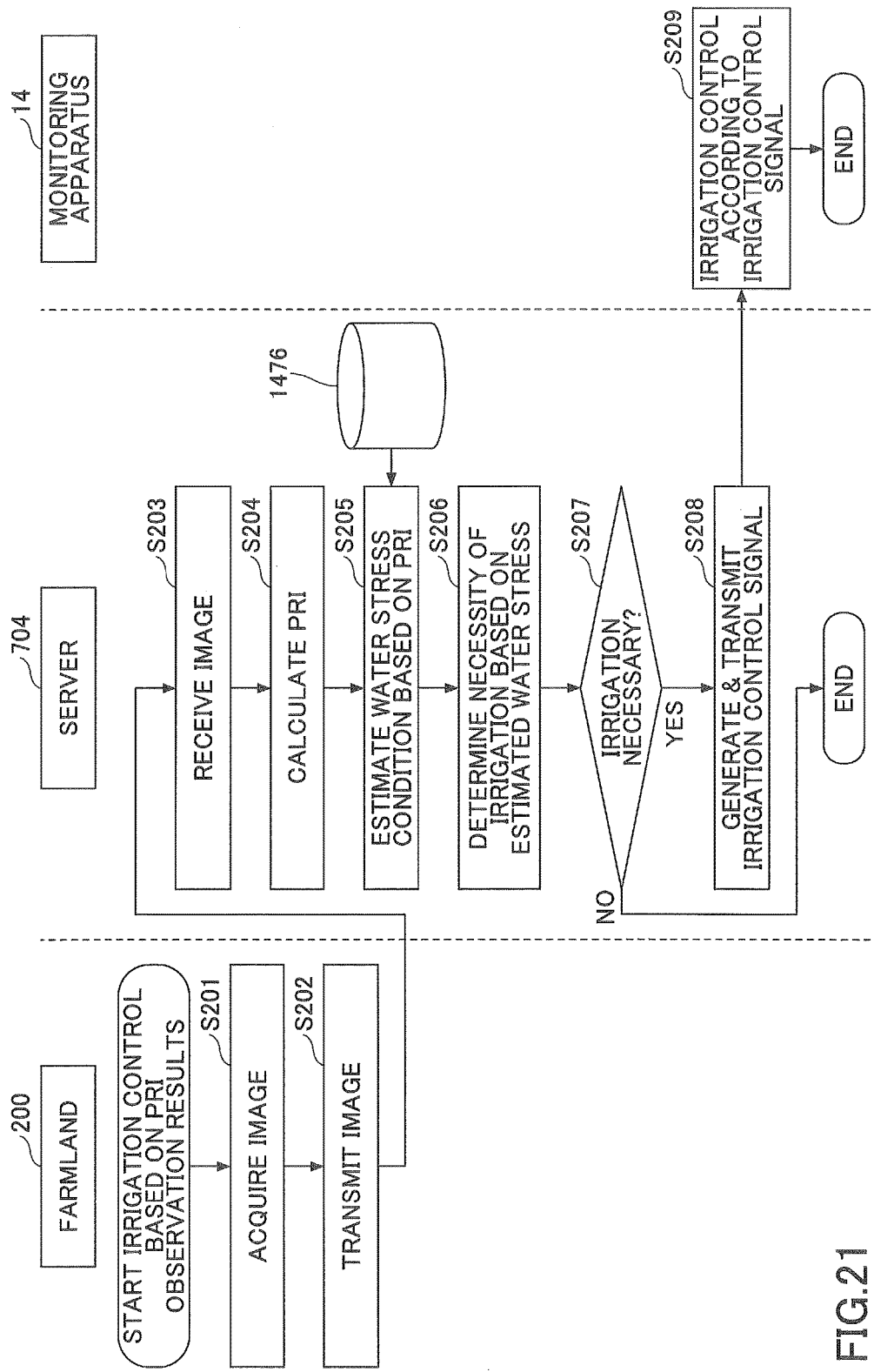
FIG. 21 is a flowchart illustrating exemplary irrigation control operations implemented by the farmland management system.

In the following, irrigation control using the data representing the correspondence between the water stress and the favorable PRI is described with reference to FIG. 21. FIG. 21 is a flowchart illustrating exemplary irrigation control operations implemented by the farmland management system 100. Note that the process of FIG. 21 may be repeatedly executed every few minutes, for example.

The multispectral camera 450 arranged in the farmland 200 (monitoring apparatus 14) intermittently captures an image of the plant (step S201). The image capturing interval is preferably about every minute.

Then, the multispectral camera 450 transmits the captured image to the server 11 (step S202).

The server 11 receives the image (step S203), and the server 11 analyzes the received image to calculate the PRI (step S204).

Then, the server 11 compares the calculated PRI with data stored in the secondary storage device 1476 to estimate the water stress conditions (step S205). For example, the server 11 may acquire the PRI corresponding to the current cultivation time (months) from FIG. 20B and compare the acquired PRI with the PRI that was calculated in step S204.

Then, the server 11 determines whether irrigation is necessary based on the estimated water stress conditions (step S206). Specifically, the server 11 may control irrigation to compensate for the difference between the water stress conditions estimated in step 205 and the desired water stress conditions. That is, the server 11 determines that irrigation needs to be performed if the estimated water stress conditions (PRI) corresponds to water-deficient conditions as in comparison to the desired water stress conditions (corresponding to the favorable PRI), and the server 11 determines that irrigation does not have to be performed if the estimated water stress conditions correspond to adequately-watered conditions or overly-watered conditions.

In the case of performing irrigation (YES in step S207), the server 11 generates an irrigation control signal and transmits the generated irrigation control signal to the monitoring apparatus 14 (step S208). Note that in some embodiments, the server 11 may transmit the irrigation control signal directly to the sprinkler 22, for example.

In turn, the monitoring apparatus 14 performs irrigation control according to the irrigation control signal (step S209).

As described above, by monitoring the PRI, irrigation may be properly controlled. Note that the PRI does not necessarily have to be calculated based on the reflectance of the wavelengths 531 nm and 570 nm. That is, the PRI may be calculated based on the reflectance of optimum wavelengths for each plant. Also, the PRI does not necessarily have to be calculated, and in some embodiments, the water stress conditions may be monitored based on the reflectance of a given wavelength without calculating the PRI.

Also, by connecting the growth measuring apparatus 40 of the present embodiment to the GPS device 45, the location of a plant such as rice in the farmland 200 may be determined and growth data (growth information) may be mapped by adding positional information to the growth data (growth information). Further, the measurement time and weather data (weather, temperature, etc.) may also be added, for example. Such items of information may be accumulated as annual data, and the accumulated data may be reflected in irrigation control and growth plans to enable more efficient growth of a crop. For example, by intentionally varying the amount of water supplied to each area and comparing the growth data of a crop in each area, a suitable amount of water to be supplied to the crop (appropriate sprinkling water volume for the crop) may be determined.

Such series of data may be stored in the storage unit 434 and subsequently read by operating the controller unit 44, or the data may be instantly output to the controller unit 44 via radio waves, for example.

In the present embodiment, the growth measuring apparatus 40 uses the first light receiving unit 41 to receive light reflected by plants such as rice grown in the farmland 200 and performs data processing based on the light intensity of the received data. Meanwhile, the growth measuring apparatus 40 uses the second light receiving unit 42 to receive sunlight directly from the sun as the light source and uses the received sunlight as a reference beam to obtain its reflectance. That is, in the present embodiment, there is no need to capture multiple images of the farmland 200 with a digital camera and process multiple sets of data as is done in conventional practice. Thus, as compared with the case of using a digital camera, in the growth measuring apparatus 40 of the present embodiment, the configuration of the optical system may be simplified, and the configuration of the computer system that performs data processing may be simplified. Moreover, data processing may be performed in a short period of time such that the growth conditions of the plants such as rice may be promptly assessed based on the light intensity, working efficiency may be improved at low cost.

In contrast to conventional techniques, the growth measuring apparatus 40 of the present embodiment simply processes one set of information obtained from the farmland 200 as the measuring object (average value of reflected light from entire group of plants subject to measurement) and is therefore capable of performing very simple growth assessment. Note that the above-described first growth index I and the second growth index II that are calculated by the computing unit 433 of the growth measuring apparatus 40 have a correlation with measurement results obtained on the ground.

<Control based on Amount of Photosynthesis>

The amount of photosynthesis that occurs in a plant is useful information for observing the state of the plant. If the plant is a tree, the amount of photosynthesis is believed to have a correlation with the canopy. The canopy refers to a portion of a plant (e.g. tree) formed by branches and leaves that directly receive sunlight. The size of the canopy can be indirectly measured based on the area of a shade formed on the ground by the tree under fair weather conditions. To measure the area of the shade from an image, a large area of the ground has to be imaged using an ultra-wide-angle camera, and the camera needs to be properly arranged so that the entire area to be imaged falls within the angle of view of the camera. Note that an omnidirectional camera is capable of capturing an omnidirectional full-angle image, and as such, in the case of using an omnidirectional camera, the angle of view does not have to be adjusted, a greater degree of freedom may be allowed in arranging the camera.

Figure 22A:
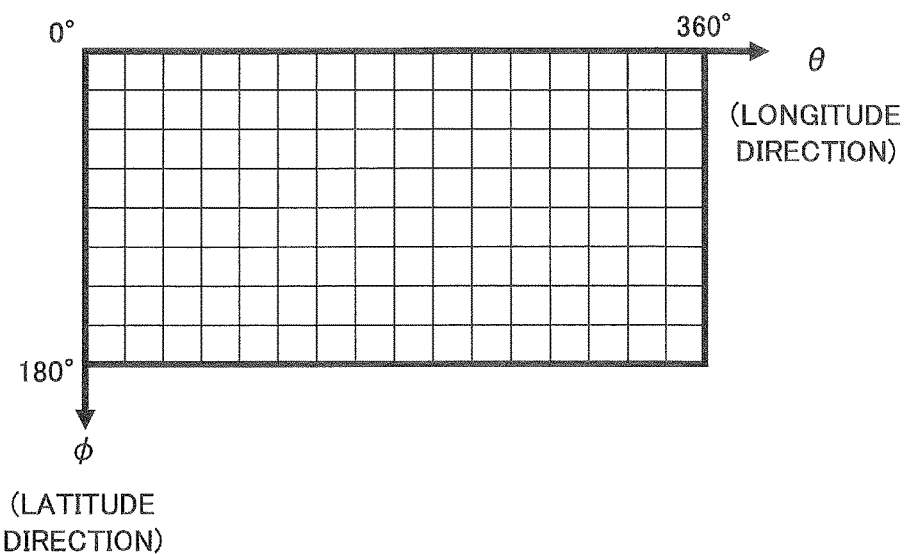
FIGS. 22A and 22B schematically illustrate an example of omnidirectional image data.
Figure 22B:
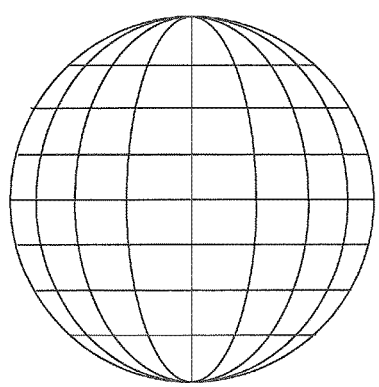

FIGS. 22A and 22B illustrate exemplary models for representing an image captured by an omnidirectional camera. FIG. 22A is a diagram schematically illustrating omnidirectional image data. The omnidirectional image data has a 360-degree angle of view in the horizontal direction and a 180-degree angle of view in the vertical direction, and thus represents light captured from all directions covering a full sphere.

Thus, as illustrated in FIG. 22B, image data covering all directions from a spherical center may be obtained. Note that the angle θ in FIG. 22A corresponds to the longitude direction of FIG. 22B, and the angle φ in FIG. 22A corresponds to the latitude direction of FIG. 22B.

Figure 23:
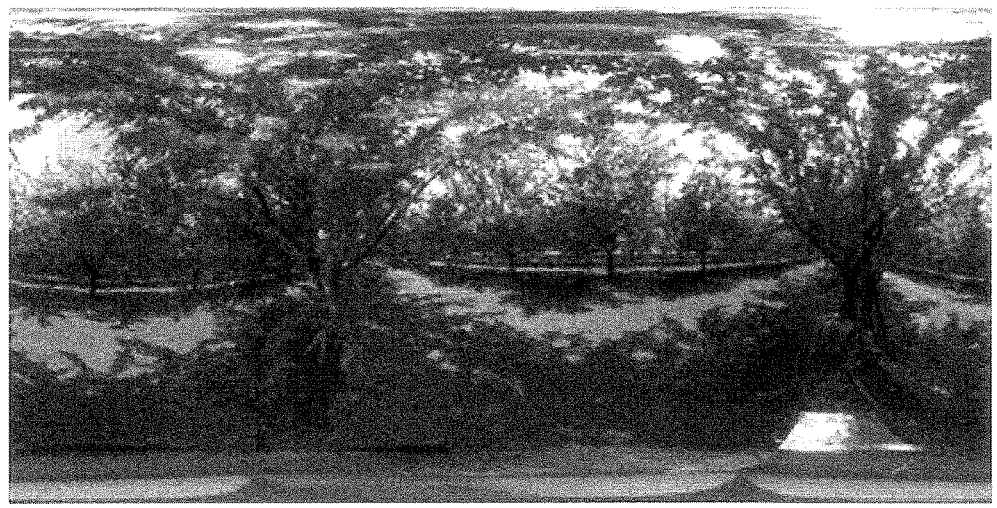
FIG. 23 illustrates an example of an omnidirectional image captured at a farmland.

FIG. 23 illustrates an example of an actual omnidirectional image of the farmland 200. As can be appreciated, an image covering a range from the ground up to the zenith over a 360-degree angle in the horizontal direction is obtained.

In the following, process operations for calculating the size of the shade formed on the ground from omnidirectional image data are described. Note that the following process operations may be executed by the server 11 or the monitoring apparatus 14. However, in the descriptions below, it is assumed that the process operations are to be executed by the server 11.

Step 1: The shade calculation unit 114 of the server 11 generates a plane image of the ground from the omnidirectional image data.

Step 2: The shade calculation unit 114 of the server 11 extracts a shade portion from the plane image of the ground to calculate the area of the shade.

In the following, each of the above steps is described in greater detail.

In step 1, a plane image of the ground is generated from the omnidirectional image data. Note that the relationship between the coordinates (θ, φ) of the omnidirectional image illustrated in FIG. 22A and the coordinates (x, y) of the plane image of the ground may be represented by the following set of formulas (4):

$$\left.\begin{array}{l}\theta = \sin^{-1}\left(\frac{x}{h}\right) \\ \varphi = 180 - \sin^{-1}\left(\frac{h}{\sqrt{h^2 + f^2}}\right) \\ h = \sqrt{x^2 + y^2}\end{array}\right\} \quad (4)$$

$f = h_{max} / \tan\varphi_{max}$ $h_{max}$: IMAGE HEIGHT WITH RESPECT TO HALF VIEWING ANGLE OF PLANE IMAGE $\varphi_{max}$: HALF VIEWING ANGLE OF PLANE IMAGE The plane image of the ground can be generated based on the above relationships. Note, however, that the above set of formulas (4) assumes that the zenith direction of the omnidirectional image data corresponds to a direction perpendicular to the ground.

Figure 24:
FIG. 24 illustrates an example of a plane image converted from the omnidirectional image.

Also, the half viewing angel of the plane image (angle of the edge of the object with respect to the optical axis of the lens) is set according to the range of the ground to be monitored. Note that because the half viewing angle of the plane image can be no greater than 90 degrees (diffusion occurs at 90 degrees), the half viewing angle is preferably set to no more than about 75 degrees at the maximum. FIG. 24 illustrates an example of a plane image converted from an omnidirectional image based on the above set of formulas (4).

In step 2, the shade calculation unit 114 extracts a shade portion from the plane image of the ground and calculates the area of the extracted shade portion.

Specifically, first, an RGB color image is converted into a black and white image (luminance image). For example, the conversion may be performed using a formula such as luminance Y=(R+2G+B)/4. Note that in a case where the original image is a black and white image, the above conversion does not have to be performed.

Figure 25:
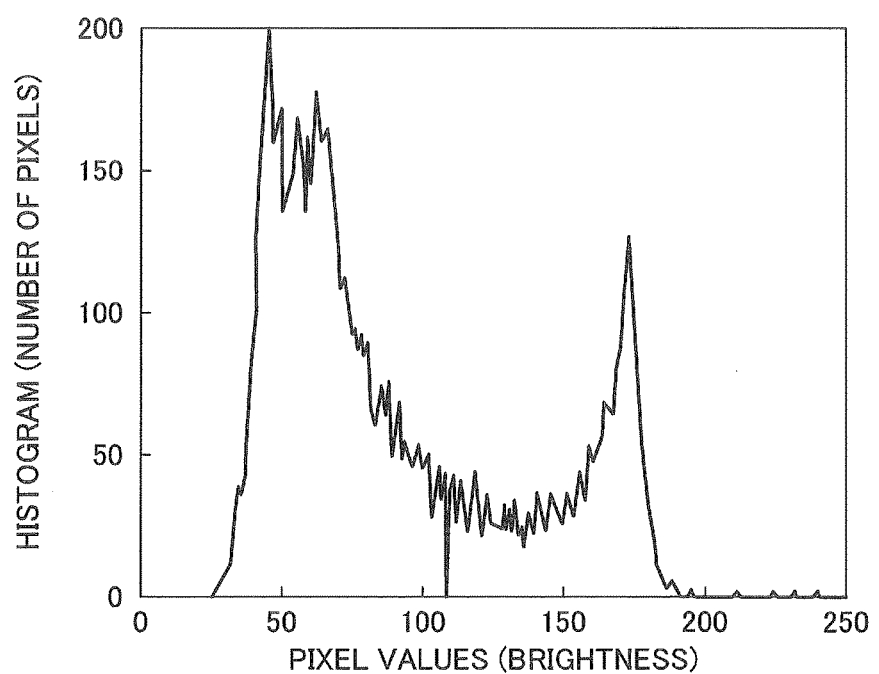
FIG. 25 illustrates an exemplary histogram of a binarization result.

Next, the shade calculating unit 114 performs binarization to separate the image into a sunny portion and a shade portion. FIG. 25 illustrates an exemplary histogram of the binarization result. In FIG. 25, the horizontal axis represents the pixel value (0 to 255) indicating the brightness of the pixel and the vertical axis represents the number of pixels. Note that the binarization may involve classifying the pixels into two classes using the so-called k-means method, for example. In the case of using the k-means method, two centroids corresponding to the two classes are determined, and each pixel is assigned according to its pixel value to the centroid that is closer in value. The initial two centroids are set somewhat apart. After assigning all the pixels, new centroids are determined based on the assigned pixels, and each pixel is assigned according to its pixel value to the centroid that is closer in value. The above process is repeated until there is not movement of pixels, and at such time, it may be determined that the binarization has been completed. In FIG. 25, the image can be binarized at a pixel value of around 110. Note, however, that the method of binarization is not limited to the k-means method.

Then, the shade calculation unit 114 counts the pixels corresponding to the shade portion (less than the pixel value 110), and calculates the shade ratio with respect to the whole image. The actual area of the shade may be obtained by multiplying the shade ratio by the actual area of the entire plane image. However, in the plane image of FIG. 24, the distance between adjacent trees is relatively short such that the shades formed by the trees are interconnected. Thus, instead of calculating the canopy of the individual trees, the canopy of the each area may be calculated and used.

Note that the image used for shade calculation is preferably an omnidirectional image captured under fair weather conditions. If the image is not captured at the time of fair weather, the boundary between the shade portion and the sunny portion may not be clear and it may be difficult to accurately calculate the shade ratio. In a case of automatically determining whether an image has been captured under fair weather conditions, the above-described binarization results may be utilized. For example, in the case of using the k-means method, when the difference between the average values of the two classes (sunny class and shade class) is small, this means that the difference between the pixels belonging to the sunny portion and the pixels belonging to the shade portion is small such that a clear shade cannot be perceived from the image. Thus, whether an image has been captured under fair weather conditions may be automatically determined by comparing the difference between the average values of the classes with a threshold value, for example.

<Pesticide Spraying Apparatus>

Figure 26A:
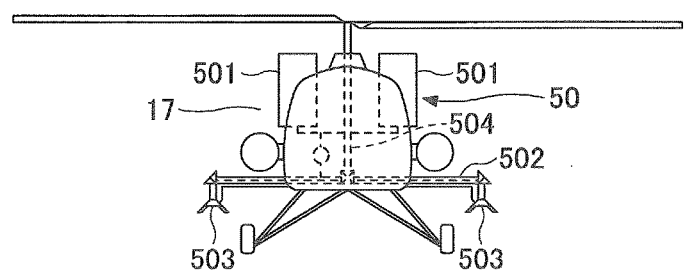
FIGS. 26A and 26B illustrate an exemplary pesticide spraying apparatus.
Figure 26B:
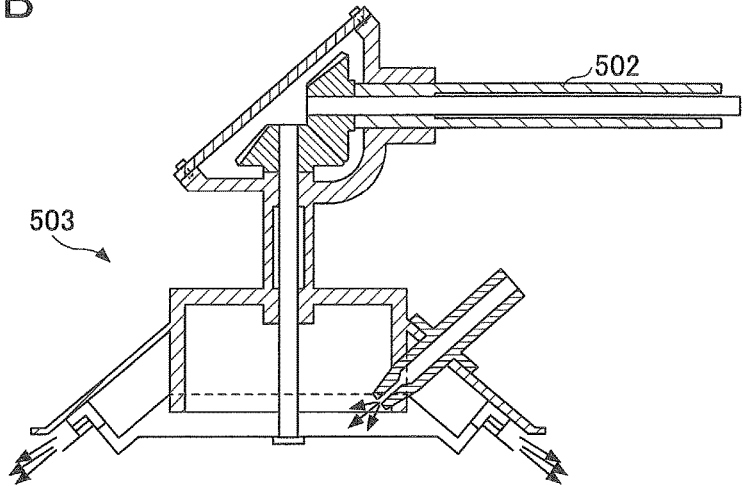

In the following, a pesticide spraying apparatus 50 using the moving object 17 is described. In the example described below, it is assumed that the helicopter illustrated in FIG. 9 is used as the moving object 17. FIG. 26 illustrates an example of the pesticide spraying apparatus 50. FIG. 26A is a schematic view of the moving object 17 to which the pesticide spraying apparatus 50 is applied, and FIG. 26B is an enlarged view of a spraying unit 503 of the pesticide spraying apparatus 50.

The moving object 17 may have a main rotor and a stabilizer arranged at the upper end of a main shaft 504 that is pivotally supported in a fuselage. A chemical liquid tank 501 is arranged at the rear side of the moving object 17. A chemical liquid stored in the chemical liquid tank 501 passes through a supply path 502 that extends from the fuselage towards the outer sides of the fuselage and is sprayed from the spraying unit 503.

The moving object 17 may be flown by starting an engine unit arranged in the fuselage so that the main shaft may be continuously rotated and then activating a servo mechanism arranged in the fuselage through wireless navigation by the controller unit 44. With the rotation of the main shaft, the chemical liquid in the supply path 502 is urged toward the spraying unit 503. Thus, a person navigating the moving object 17 from the ground may operate the controller unit 44 to navigate the moving object 17 above an area where pesticides are to be sprayed and release the spraying unit 503 at the position above the relevant area. In this way, the chemical liquid in the chemical liquid tank 501 may be sprayed toward the ground from the spraying unit 503.

<Soil Collection>

Figure 27:
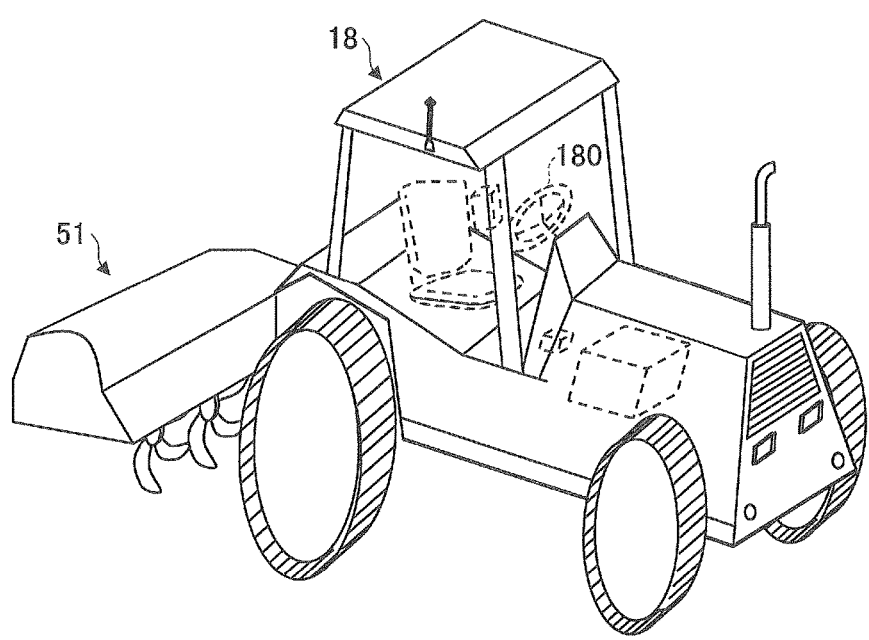
FIG. 27 illustrates a tractor as an example of an agricultural machine.

In the following, soil collection operations are described with reference to FIGS. 27 and 28. FIG. 27 is a diagram illustrating a tractor as an example of an agricultural machine 18. The illustrated tractor includes left and right front running wheels arranged at the outer sides of a hood that accommodates an engine unit, a steering wheel 180 arranged at a rear portion of the hood, a driver's seat arranged at the rear side of the steering wheel 180, and left and right rear running wheels arranged at the outer sides of the driver's seat. The tractor may be driven by an operator that is seated at the driver's seat, for example. The tractor may also be driven without an operator, for example.

Also, a collecting unit 51 for collecting soil is mounted to the rear side of the tractor via a lower link and a top link. The collecting unit 51 can be freely raised and lowered, and soil samples of the farmland 200 are automatically collected by a collecting claw of the collecting unit 51 that is moved along a certain trajectory. Further, a main body case is detachably fixed at the front side of the steering wheel 180.

Figure 28:
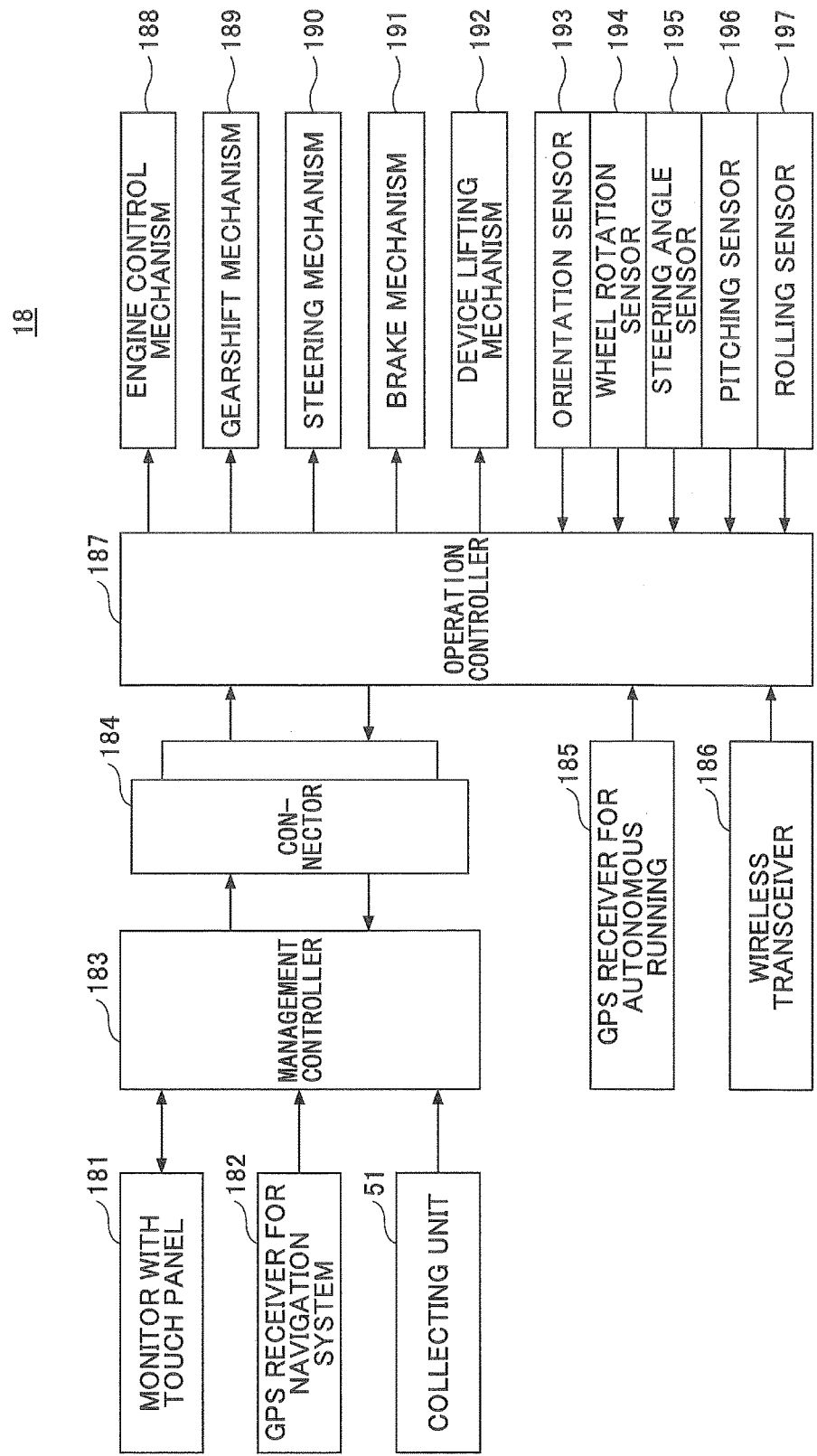
FIG. 28 is a block diagram illustrating an exemplary configuration of an agricultural machine.

FIG. 28 is a block diagram illustrating an exemplary configuration of an agricultural machine 18. The agricultural machine 18 is controlled by an operation controller 187. The operation controller 187 is connected to a management controller 183 via a detachable connector 184. A monitor with a touch panel 181, a GPS receiver 182 for a navigation system, and the collecting unit 51 are connected to the management controller 183. Also, a GPS receiver 185 for autonomous running, a wireless transceiver 186, an engine control mechanism 188, a gearshift mechanism 189, a steering mechanism 190, a brake mechanism 191, a device lifting mechanism 192, an orientation sensor 193, a wheel rotation sensor 194, a steering angle sensor 195, a pitching sensor 196, and a rolling sensor 197 are connected to the operation controller 187.

The engine control mechanism 188 automatically adjusts the rotational speed of the engine unit of the tractor to a pre-set rotational speed for the accelerator. The gearshift mechanism 189 automatically controls the running speed of the tractor based on orientation data from the GPS receiver 185 for autonomous running and farmland terrain data of a soil map. The steering mechanism 190 automatically changes the traveling path of the tractor based on the orientation data from the GPS receiver 185 for autonomous running and the farmland terrain data of the soil map. The device lifting mechanism 192 automatically raises and lowers the collecting unit 51 when the tractor turns in another direction at a headland of the farmland 200 based on the orientation data from the GPS receiver 185 for autonomous running and the farmland terrain data of the soil map.

The operation controller 187 performs soil sample analysis while identifying a soil sample collecting location from which a soil sample is to be extracted and placed in a collection pot of a tray based on the soil map and the orientation data from the GPS receiver 185 for autonomous running. Also, the operation controller 187 creates a soil map of the farmland 200 according to the soil sample analysis results. In this way, the agricultural machine 18 such as the tractor may be driven around the farmland 200 with or without an operator to automatically perform operations for collecting soil samples and creating a soil map.

An antenna of the GPS receiver 185 for autonomous running is fixed to the top surface of a cabin ceiling that is located above the driver's seat. The antenna is suitably arranged at the top of the cabin ceiling so as to minimize influences of disturbance to radio waves of the device lifting mechanism 192 and the engine control mechanism 188, and enable accurate signal reception, for example. By effectively utilizing the GPS receiver 185 for autonomous running, farmland mapping operations may be performed with respect to a given farmland 200 by moving the agricultural machine 18 within the farmland 200. Thus, even a person that has never inspected a given farmland 200 may be able to perform central management of a plurality of farmlands 200 and efficiently perform suitable farming operations for each farmland 200, for example.

<Greenhouse Control>

Figure 29:
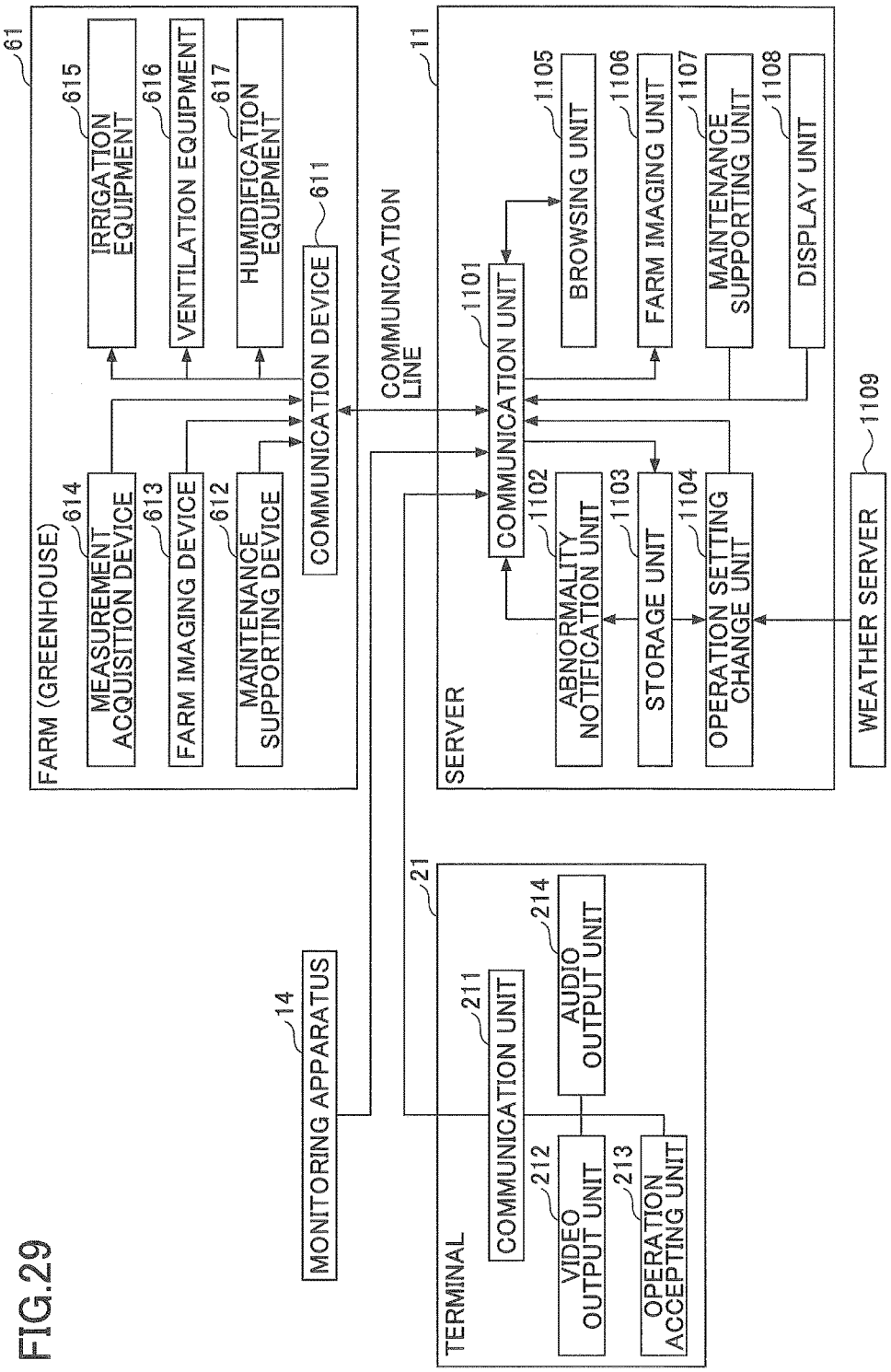
FIG. 29 is a block diagram illustrating an exemplary configuration of a farmland management system including a greenhouse.

FIG. 29 is a block diagram illustrating an exemplary configuration of the farmland management system 100 including a greenhouse. Note that illustrations of the elements and features illustrated in FIG. 5 are omitted in FIG. 29. In FIG. 29, a greenhouse 61, the monitoring apparatus 14, and the terminal 21 are connected to the server 11. The greenhouse 61 includes a communication device 611, a measurement acquisition device 614, a farm imaging device 613, a maintenance supporting device 612, irrigation equipment 615, ventilation equipment 616, and humidification equipment 617. The measurement acquisition device 614 acquires measurement values. The farm imaging device 613 captures images of the farmland 200 and the greenhouse 61. The maintenance supporting device 612 supports maintenance operations. The irrigation equipment 615 performs irrigation operations. The ventilation equipment 616 performs ventilation operations. The humidification equipment 617 performs humidification operations. The farmland management system 100 including the greenhouse 61 is capable of performing ventilation operations and controlling the humidity and/or temperature with in the greenhouse 61 in addition to implementing the other various aspects of farmland management operations of the farmland management system 100 as described above.

In FIG. 29, the server 11 includes a communication unit 1101, a storage unit 1103, a browsing unit 1105, an abnormality notification unit 1102, an operation setting change unit 1104, a farm imaging unit 1106, a maintenance supporting unit 1107, and a display unit 1108.

The communication unit 1101 receives information relating to the farmland 200 transmitted from the monitoring apparatus 14. The received information relating to the farmland 200 is stored in the storage unit 1103. The storage unit 1103 stores information relating to the farmland 200 received by the communication unit 1101. Also, the storage unit 1103 sets up a storage period or a storage interval for the stored information relating to the farmland 200 according to the type of the information relating to the farmland 200. The browsing unit 1105 processes the information relating to the farmland 200 stored in the storage unit 1103 into a suitable form that can be handled by the terminal 21 in response to a request from the terminal 21, and transmits the processed information to the terminal 21. The browsing unit 1105 may provide information in various forms such as displaying a list of information relating to a present farm; displaying information relating to a specific farm such as a development graph or a comparison with a reference example (e.g. average value of previous records), or displaying the status of growth, which is described below.

The abnormality notification unit 1102 determines whether a current state or condition is suitable for the cultivation of crops based on the information relating to the farmland 200 that is stored in the storage unit 1103 and weather information stored in a weather server 1109, for example, and sends an abnormality notification to a pre-designated notification destination in the case where the current state or condition is determined to be an unsuitable state or condition. Examples of situations where an abnormality notification would be issued include a case where the temperature within the greenhouse 61 has become unsuitably high or low for cultivating a crop, a case where the greenhouse 61 is susceptible to destruction by strong winds, and a case where there is not enough moisture in the soil, for example.

The maintenance supporting unit 1107 supports maintenance operations by the maintenance supporting device 612.

Figure 30:
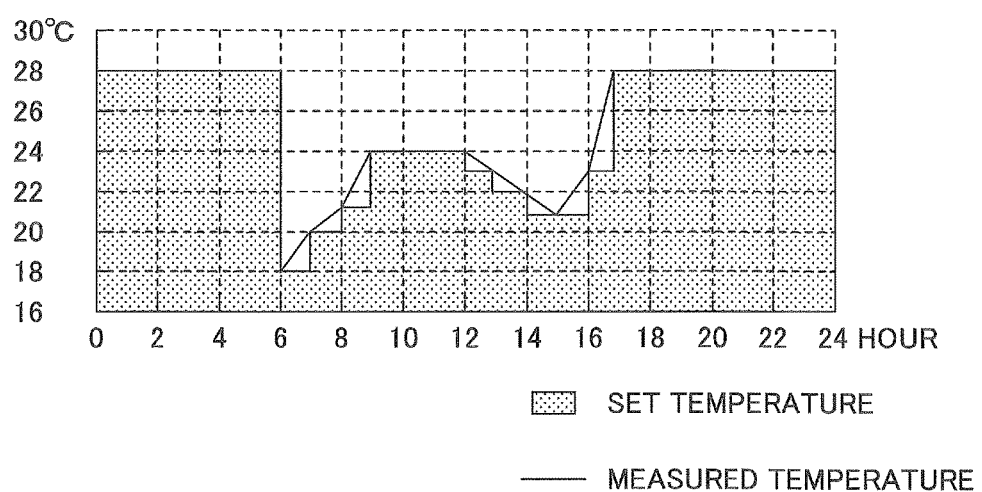
FIG. 30 is a graph representing examples of a set temperature and a measured temperature.

FIG. 30 is a graph illustrating examples of a set temperature and a measured temperature. In the illustrated example, the measured temperature conforms to the set temperature such that an abnormality notification does not have to be issued.

In some embodiments, a plurality of abnormality notification units 1102 may be provided, and an abnormality notification may be sent to a relevant party by telephone, a mobile phone, a pager (registered trademark), facsimile, e-mail, or some other means according to settings made in advance, for example. Also, the abnormality notification unit 1102 may optionally be set up to send an abnormality notification to dedicated personnel responsible for dealing with the abnormality occurrences. Further, conditions necessary for detecting the occurrence of an abnormality may be stored in advance in the storage unit 1103.

The operation setting change unit 1104 transmits operation settings of the greenhouse 61 via the communication unit 1101 and the communication device 611 in order to maintain the environment inside the greenhouse 61 in a desired state, and prompts the greenhouse 61 to change its operation settings accordingly. The farm imaging unit 1106 receives an image transmitted from the monitoring apparatus 14 via the communication unit 1101, and may store the received image in the storage unit 1103, display the image on the display unit 1108, or transmit the image to the terminal 21, for example.

The information relating to the farmland 200 obtained by the monitoring apparatus 14 is stored in the storage unit 1103 via the communication unit 1101. By storing the information relating to the farmland 200 in the server 11, the information on the farmland 200 may be viewed at any given location via a communication line. Also, the stored information on the farmland 200 may be compared with various types of information, subject to statistical processing, or used in other various ways to enable more efficient farming operations, for example. Relevant personnel of the farmland 200 may be able to view the farmland information stored in the storage unit 1103 by connecting the terminal 21 to the server 11 and using the browsing unit 1105. The terminal 21 may be directly connected to the server 11 or be connected via a communication line, and thus, the relevant personnel may view the information relating to the farmland 200 from any given location.

Also, when transmitting the farmland information to the terminal 21, the server 11 may process the farmland information into a graph or perform deviation processing, for example, so that the farmland information may be more clearly presented and analysis of the farmland information may be facilitated. Further, because the farmland information can be processed into different forms, the farmland information may be suitably viewed regardless of whether the terminal 21 is a relatively simple device such as a mobile phone or a fax machine, or a more sophisticated device, for example.

The terminal 21 includes a communication unit 211, a video output unit 212, an operation accepting unit 213, and an audio output unit 214. The terminal 21 is connected to the server 11 via the communication unit 211. The video output unit 212 displays information relating to the farmland that is transmitted from the server 11. The audio output unit 214 outputs audio. A command transmitted to the server 11 may be input via the operation accepting unit 213.

The terminal 21 may be, for example, a personal computer, a tablet, a smartphones, a mobile phone, a PDA (Personal Digital Assistant), or a wearable PC, but is not limited thereto.

The method of establishing connection between the terminal 21 and the server 11 may be arbitrarily selected. In the present embodiment, the terminal 21 and the server are interconnected via a communication line or a network. The communication protocol used may be HTTP but is not limited thereto. Also, a plurality of terminals 21 may be connected to the server 11.

<Server Function>

Figure 31:
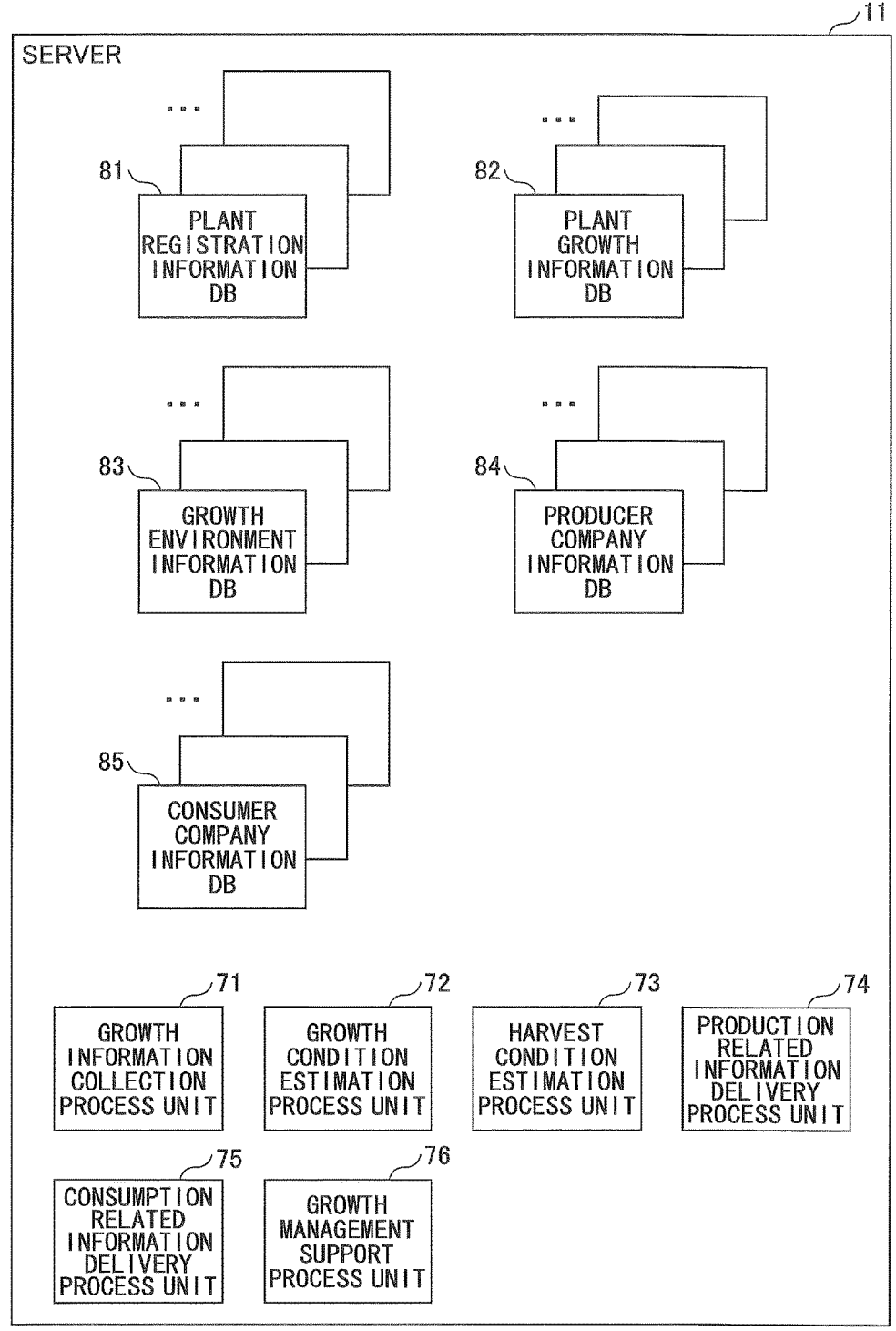
FIG. 31 illustrates exemplary functional elements of the server.

FIG. 31 is a diagram illustrating exemplary functional elements of the server 11. In FIG. 31, the server 11 includes a growth information collection process unit 71, a growth condition estimation process unit 72, a harvest condition estimation process unit 73, a production related information delivery process unit 74, a consumption related information delivery process unit 75, and a growth management support process unit 76. These functional units may be implemented by the CPU 1471 executing the program 1477 in cooperation with hardware. Also, the server 11 includes databases (DB) including a plant registration information DB 81, a plant growth information DB 82, a growth environment information DB 83, a producer company information DB 84, and a consumer company information DB 85.

The server 11 may acquire image information of an area of the farmland 200 captured by the monitoring apparatus 14 and additional information other than the image information (e.g., plant growth information such as the NDVI, pest information, frost information, discoloration information by pests, soil information, sugar content information). Note that the server 11 may acquire information on the spectral reflectance from the monitoring apparatus 14, for example, and process the acquired information to obtain growth information (e.g., NDVI) of a plant.

Based on the image information and the additional information, the server 11 may detect a location where the plant requires some type of work such as watering, fertilizing, weeding, or the like. For example, the server 11 may detect such a location requiring work by identifying a location within a spectral image where the NVDI is less than or equal to a predetermined value or is below a predetermined value. Alternatively, instead of using the NVDI, the server 11 may identify a location where the spectral reflectance is less than or equal a predetermined value or is below a predetermined value within a spectral image of a wavelength in the visible red region (e.g., 660 nm).

Further, the server 11 may identify a position within the detected location requiring work. For example, the server 11 may perform an image recognition process to recognize a plurality of objects existing within the captured image of the farmland 200. The server 11 may then identify the position within the location requiring work based on a positional relationship between the plurality of recognized objects and the location requiring work.

The server 11 may transmit to the agricultural machine 18 and the terminal 21 the identified position as a work location and end the process thereafter. In this case, the agricultural machine 18 would not have to measure the growth of a crop and the like with respect to each and every area that may be subject to work (farming operations) and may therefore be able to perform work in a more efficient manner, for example. Thus, the working time may be reduced, and a user may easily determine the location (position) requiring work.

In the following, exemplary process operations in a case of checking the condition of each crop subject to work and individually performing work on each crop are described. When the process is started, the agricultural machine 18 may acquire image information and additional information of a crop and transmit the acquired information to the server 11. At this point, the agricultural machine 18 may be temporarily stopped, for example.

Note that the acquired image information and additional information may include image information acquired by the growth measuring apparatus 40 that is included in the agricultural machine 18, and additional information other than the image information acquired by the measuring apparatus (e.g., disparity value or distance information in the case a stereo camera is used, spectral reflectance information for each wavelength or information calculated based on the spectral reflectance in a case where a multispectral camera is used). Also, the acquired additional information may include distance information and/or profile information obtained by a laser radar apparatus, for example.

Also, an image captured by the monitoring apparatus 14 through control by the agricultural machine 18, the server 11, or the terminal 21, or an image autonomously captured by the monitoring apparatus 14 may be transmitted to the server 11. Also, spectral reflectance information for each wavelength, information calculated using the spectral reflectance, polarization information, and/or solar radiation area information may similarly be transmitted to the server 11.

Also, additional information other than the image information captured by the monitoring apparatus 14 (e.g., temperature and humidity information acquired by the monitoring apparatus 14, weather forecast and solar radiation information acquired via the Internet) may be transmitted to the server 11. Note that information acquired in this process step may vary depending on the type of work to be performed by the agricultural machine 18.

The server 11 that has received the various items of information from the monitoring apparatus 14, the irrigation apparatus 20, the moving object 17, the growth measuring apparatus 40, the pesticide spraying apparatus 50, and the agricultural machine 18 analyzes the received information.

For example, when the work to be performed involves fertilizing, the server 11 may check the NDVI of the leaves of each crop and examine the spectral distribution of soil. The server 11 may then determine whether fertilizers need to be sprayed based on the examination result. In the case where the work involves weeding, the server 11 may perform an image recognition process and determine whether a given object corresponds to a weed. Upon determining that a given object corresponds to a weed, the server 11 may have pesticides sprayed on the weed, for example. Also, the server 11 may calculate a distance from the moving object 17 to the weed so that a pickup arm of the moving object 17 may be carried to the position of the weed, for example.

In a case where the work involves harvesting, the server 11 may analyze the crop size and color, and the sugar content, for example, to determines whether to harvest the crop.

The plant registration information DB 81 stores information relating to a crop registered by an administrator growing the crop (e.g., type, seeding date, growth environment) and corresponding administrator information in association with a crop ID for identifying the crop. The administrator information may include an administrator ID for identifying the administrator growing the crop and information indicating whether the administrator is a producer company or a company that has been commissioned to produce the crop. The plant registration information DB 81 also stores water source position information in association with the crop ID and the administrator ID of the registered crop.

The plant growth information DB 82 stores growth information of a crop obtained from the growing location of the crop in association with the crop ID identifying the crop and the administrator ID identifying the administrator growing the crop.

The growth environment information DB 83 stores growth environment information of the crop. The growth environment information may include soil information acquired from the growing location of the crop, weather information obtained from an information provider such as the weather server 1109, and water source information, for example. The growth environment information may also include information such as the temperature and humidity obtained by the monitoring apparatus 14, for example. Note that the growth environment information is also stored in association with the crop ID identifying the crop and the administrator ID identifying the administrator growing the crop. Further, in some embodiments, an information provider DB for storing information relating to the weather, the water source, and the like acquired from an information provider such as the weather server 1109 may be provided.

Also, at least one of the plant registration information DB 81, the plant growth information DB 82, and the growth environment information DB 83 stores crop registration information for estimating the growth condition of a crop.

The producer company information DB 84 registers information on producer companies that produce crops. The consumer company information DB 85 registers information on consumer companies that consume the crops.

In the following, process operations executed by the growth information collection process unit 71 are described. The growth information collection process unit 71 is set up to be periodically activated, and upon being activated, the growth information collection process unit 71 refers to the plant registration information DB 81 to retrieve information for identifying the growing location of the crop subject to management by the management center 30 at the time and administrator information of the relevant crop.

Then, the growth information collection process unit 71 issues a command to the identified growing location to read growth information and soil information of the relevant crop. The growth information collection process unit 71 also reads weather information, water source information, and economic indicator information from an information provider such as the weather server 1109.

Then, the growth information collection process unit 71 stores the collected growth information in association with the administrator ID and the crop ID of the relevant crop in the plant growth information DB 82, and stores the collected soil information, weather information, water source information, and economic indicator information in association with the crop ID and the administrator ID of the relevant crop in the growth environment information DB 83. Note that the above series of process operations are executed with respect all growing locations of crops subject to monitoring.

Figure 32:
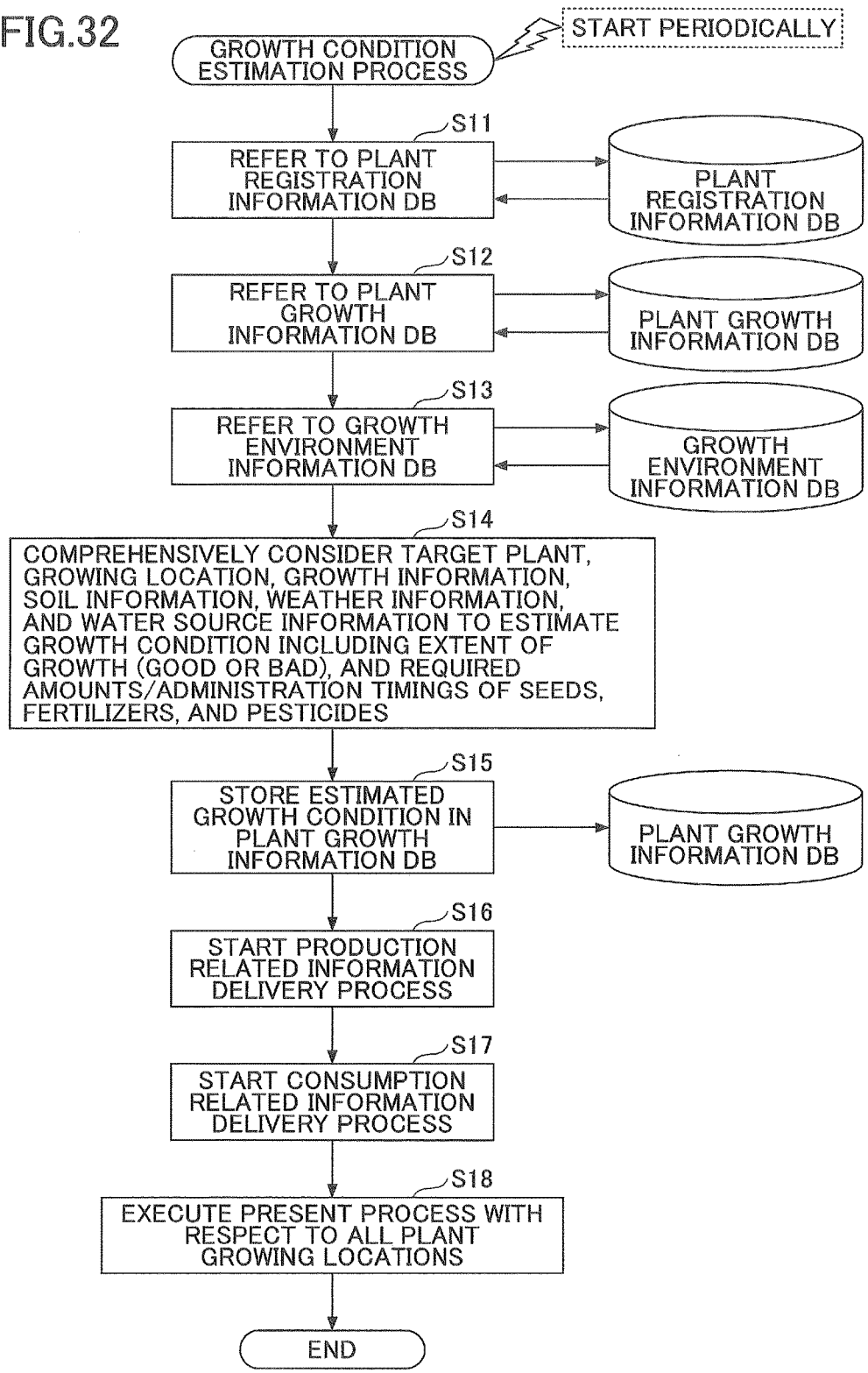
FIG. 32 is a flowchart illustrating a process implemented by a growth condition estimation process unit.

In the following, process operations executed by the growth condition estimation process unit 72 are described with reference to FIG. 32. FIG. 32 is a flowchart illustrating exemplary process steps executed by the growth condition estimation process unit 72.

First, the growth condition estimation process unit 72 refers to the plant registration information DB 81 to read information for identifying the growing location of the crop subject to management by the management center 30 at the time and conditions set up by the administrator of the relevant crop (step S11).

Then, the growth condition estimation process unit 72 refers to the plant growth information DB 82 to read the growth information of the relevant crop (step S12).

Then, the growth condition estimation process unit 72 refers to the growth environment information DB 83 to read soil information, weather information, and water source information of the relevant crop (step S13).

Then, the growth condition estimation process unit 72 comprehensively considers the growing location, the growth information, the soil information, the weather information, and the water source information, to estimate growth conditions of the relevant crop (step S14). The growth conditions that are estimated may include the extent of growth (good or bad) and information relating to the required amounts/administration timings of seeds, fertilizers, and pesticides, for example. In one example, plant growth conditions corresponding to weather conditions may be estimated by extrapolating (estimating) weather conditions based on an extrapolation average (30-year average) and associating the estimated weather conditions with plant growth conditions using an empirical formula (correlation and GMDH (Group Method of Date Handling)). Then, the estimated growth conditions are stored in the plant growth information DB 82 (step S15).

Then, the production related information delivery process unit 75 is activated to deliver production related information (step S16). The production related information includes information recording a production status of a crop.

Then, the consumption related information delivery process unit 75 is activated to deliver consumption related information (step S17). The consumption related information includes information recording a consumption status of a crop.

Note that the above series of process operations are executed with respect to all growing locations of crops subject to monitoring (step S18).

By comprehensively considering the growing location, the growth information, the soil information, the weather information, and the water source information as described above, plant growth conditions may be estimated with high accuracy. Also, by administering fine and detailed control over the irrigation apparatus 20, variations in crop quality and yield may be reduced and estimation accuracy may be further improved, for example.

Figure 33:
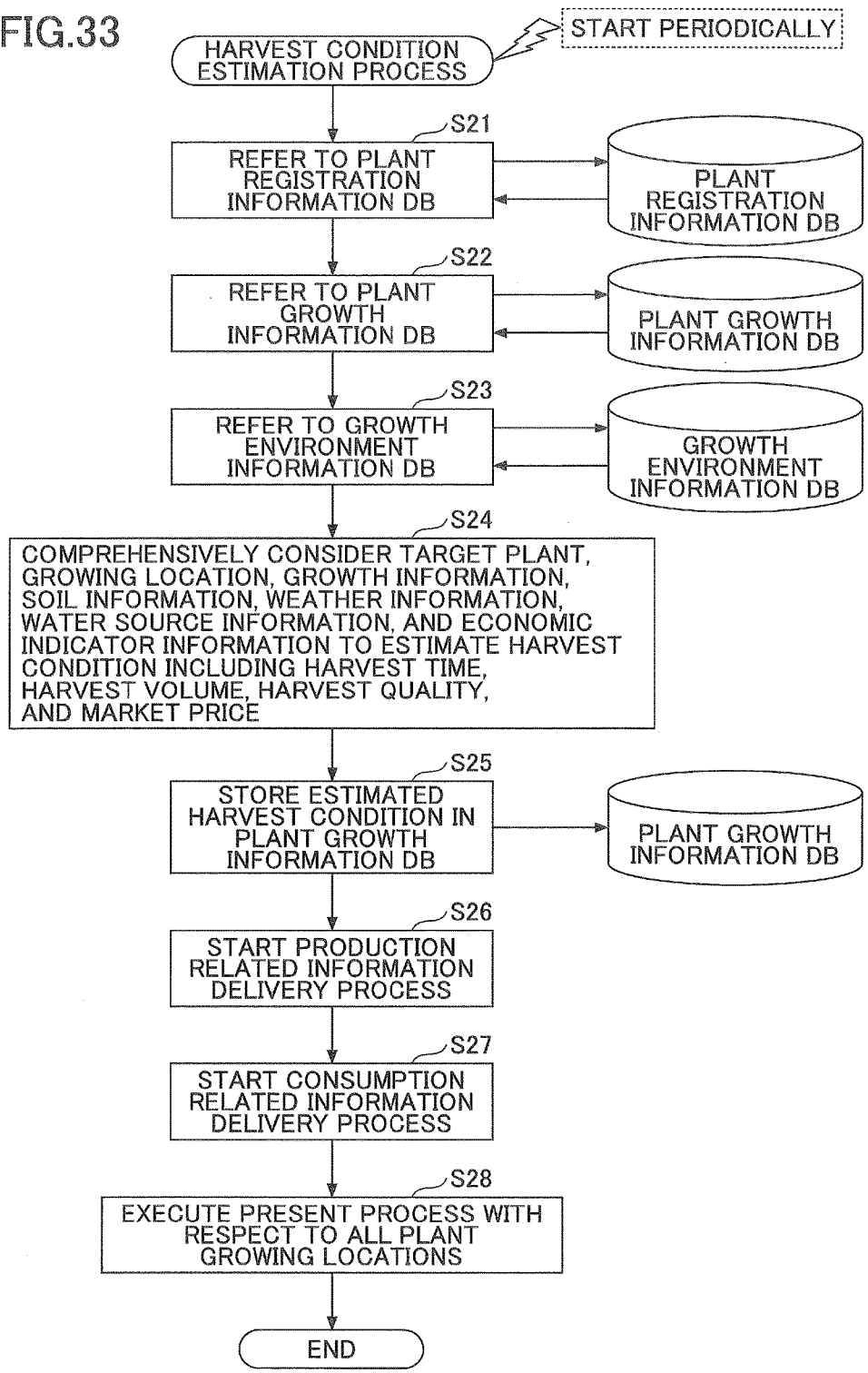
FIG. 33 is a flowchart illustrating a process implemented by a harvest condition estimation process unit.

In the following, process operations executed by the harvest condition estimation process unit 73 are described with reference to FIG. 33. FIG. 33 is a flowchart illustrating exemplary process steps executed by the harvest condition estimation process unit 73.

First, the harvest condition estimation process unit 73 refers to the plant registration information DB 81 to retrieve information for identifying the growing location of the crop subject to management by the management center 30 at the time and the conditions set up by the administrator of the relevant crop (step S21).

Then, the harvest condition estimation process unit 73 refers to the plant growth information DB 82 to read growth information of the relevant crop (step S22).

Then, the harvest condition estimation process unit 73 refers to the growth environment information DB 83 to read soil information, weather information, water source information, and economic indicator information (step S23).

Then, the harvest condition estimation process unit 73 comprehensively considers the growing location, the growth information, the soil information, the weather information, the water source information, the economic indicator information to estimate harvest conditions of the relevant crop (step S24). The harvest conditions that are estimated may include the harvest time, the crop yield, the crop quality, and information relating to the market price, for example.

Then, the harvest condition estimation process unit 73 stores the estimated harvest conditions in the plant growth information DB 82 (step S25).

Then, the production related information delivery process unit 74 is activated (step S26), and the consumption related information delivery process unit 75 is activated (step S27).

Note that the above series of process operations are executed with respect to all growing locations of crops subject to monitoring (step S28). By comprehensively considering the growing location, the growth information, the soil information, the weather information, the water source information, and the economic indicator information as described above, the harvest conditions may be estimated with high accuracy. Also, by administering fine and detailed control over the irrigation apparatus 20, variations in crop quality and yield may be reduced, and estimation accuracy may be further improved, for example.

Note that the growth conditions and the harvest conditions may be estimated through simulations using known statistical methods, fuzzy reasoning, neural networks, and/or genetic algorithms, for example.

Also, note that the growth information collection process unit 71 is an exemplary embodiment of an information detection unit that acquires information relating to a crop being cultivated according to the present invention. At least one of the plant registration information DB 81, the plant growth information DB 82, and the growth environment information DB 83 is an exemplary embodiment of a storage unit that stores crop registration information for estimating a growth condition of the crop according to the present invention. The growth condition estimation process unit 72 is an exemplary embodiment of a growth estimation unit that estimates the growth condition of the crop according to the present invention. The display unit 1108 of the server 11 is an exemplary embodiment of a display unit that displays the estimated growth condition of the crop according to the present invention.

<Modifications>

Although the present invention has been described above with respect to certain illustrative embodiments, the present invention is not limited to these embodiments, and various modifications may be made without departing from the scope of the present invention.

For example, the functions of the server 11 may be distributed across multiple servers. Also, a plurality of servers 11 may be provided. That is, the functions of the server 11 may be provided at any suitable location on a network.

Also, in some embodiments, all or a part of the functions of the server 11 may be implemented by the monitoring apparatus 14 and/or the irrigation apparatus 20. Also, in some embodiments, a part of the functions of the moving object 17 or the agricultural machine 18 may be implemented by the server 11.

Also, although a helicopter is illustrated as an example of the moving object 17 in the above-illustrated embodiment, the moving object 17 may alternatively be a glider or an airplane, for example. Also, the moving object 17 does not necessarily have to be able to fly in a case where rails or some other mechanism for moving the moving object 17 above ground is arranged on the farmland 200, for example.

Also, the agricultural machine 18 does not necessarily have to be a tractor, and may instead be a tiller, a combine harvester, a truck, or some other vehicle that can travel across the farmland 200 with or without an operator.

Also, although an example is described above where the pesticide spraying apparatus 50 sprays pesticides, the helicopter may be arranged to spray a chemical liquid other than pesticides such as a growth promoters, for example.

Also, although the soil moisture sensor 1407 simply detects the moisture in the soil in the above-described embodiment, the soil moisture sensor 1407 may also be configured to detect information other than the moisture in the soil. For example, the soil moisture sensor 1407 may be configured to detect the extent of frost, the density of roots, the root color, and/or the depth of the roots.

The present application is based on and claims the benefit of priority of Japanese Patent Application No. 2014-175800 filed on Aug. 29, 2014, and Japanese Patent Application No. 2015-128115 filed on Jun. 25, 2015, the entire contents of which are hereby incorporated by reference.

What is claimed is:

1. A farmland management system comprising:
   a plurality of sprinklers;
   an information detection unit that includes a first light receiving unit and a second light receiving unit, and that is configured to acquire information relating to a crop being cultivated;
   a storage unit configured to store crop registration information for estimating a growth condition of the crop;
   a processor configured to execute a program stored in a memory to implement
   a growth estimation process of referring to the crop registration information and estimating the growth condition of the crop based on the information relating to the crop and the crop registration information; and
   a sprinkling water volume determination process of determining one or more sprinklers to be driven from among the plurality of sprinklers and determining an amount of water to be sprinkled by the one or more sprinklers; and
   a display unit configured to display the growth condition estimated by the growth estimation process, wherein
   the first light receiving unit detects an intensity of light reflected by the crop that is cultivated in a farmland, and the second light receiving unit detects an intensity of light from a light source, whereby the information detection unit calculates a growth index of the crop based on a measured value of the light intensity detected by the first light receiving unit and a measured value of the light intensity detected by the second light receiving unit, and detects a soil moisture of each area of a plurality of areas of a farmland in which the plurality of sprinklers are arranged; and the sprinkling water volume determination process includes comparing the detected soil moisture of each area against a prescribed value, determining the amount of water to be sprinkled based on the comparison of the detected soil moisture of each area with the prescribed value, and driving the determined one or more sprinklers to sprinkle the determined amount of water.

2. The farmland management system as claimed in claim 1, wherein the information relating to the crop includes information relating to at least one of weather, temperature, wind, frost, pests, soil moisture, crop quantity, and solar radiation.

3. The farmland management system as claimed in claim 2, wherein the processor further implements a harvest estimation process of estimating a harvest condition including a harvest time and a yield of the crop based on the information relating to the crop and the growth condition estimated by the growth estimation process;

wherein the display unit displays the estimated harvest condition.

4. The farmland management system as claimed in claim 1, wherein growth information of the crop is recorded in association with each area; and the sprinkling water volume determination process includes comparing the growth information with an amount of water sprinkled in each area, and determining an appropriate sprinkling water volume based on the comparison of the growth information with the amount of water sprinkled in each area.

5. The farmland management system as claimed in claim 1, wherein the prescribed value is determined based on at least one of a type of the crop, a growth stage, a season, and a soil quality of a relevant area of the plurality of areas of the farmland.

6. The farmland management system as claimed in claim 1, wherein the growth index of the crop is calculated by the following formula:

$$(NIR-R)/(NIR+R)$$

in which R represents a ratio of the measured value of the first light receiving unit to the measured value of the second light receiving unit with respect to light in a red region, and NIR represents a ratio of the measured value of the first light receiving unit to the measured value of the second light receiving unit with respect to light in a near-infrared region.

7. The farmland management system as claimed in claim 1, wherein the information detection unit acquires a PRI (Photochemical/Physiological Reflectance Index) value of the crop.

8. The farmland management system as claimed in claim 1, further comprising:

an image capturing unit configured to obtain an omnidirectional image; and a calculation unit configured to calculate a shade area from the omnidirectional image.

9. The farmland management system as claimed in claim 8, wherein the calculation unit includes a plane image generation unit configured to generate a plane image of a ground from the omnidirectional image; and a shade calculation unit configured to calculate the shade area by extracting a sunny portion and a shade portion from the plane image through binarization.

10. A farmland management method, comprising:

a step in which an information detection unit including a first light receiving unit and a second light receiving unit acquires information relating to a crop being cultivated;

a step in which a processor implements a growth estimation process of referring to crop registration information for estimating a growth condition of the crop that is stored in a storage unit and estimating the growth condition of the crop based on the information relating to the crop and the crop registration information;

a step in which the processor implements a sprinkling water volume determination process of determining one or more sprinklers to be driven from among a plurality of sprinklers and determining an amount of water to be sprinkled by the one or more sprinklers; and a step in which a display unit displays the growth condition estimated by the growth estimation unit, wherein the first light receiving unit detects an intensity of light reflected by the crop that is cultivated in a farmland, and the second light receiving unit detects an intensity of light from a light source, whereby the information detection unit calculates a growth index of the crop based on a measured value of the light intensity detected by the first light receiving unit and a measured value of the light intensity detected by the second light receiving unit, and detects a soil moisture of each area of a plurality of areas of a farmland in which the plurality of sprinklers are arranged; and the sprinkling water volume determination process includes comparing the detected soil moisture of each area against a prescribed value, determining the amount of water to be sprinkled based on the comparison of the detected soil moisture of each area with the prescribed value, and driving the determined one or more sprinklers to sprinkle the determined amount of water.

11. A computer program product comprising a non-transitory computer-readable medium having a computer program recorded thereon that is executable by a computer, the computer program when executed causing the computer to perform:

an information detection step of acquiring information relating to a crop being cultivated;

a growth estimation step of referring to crop registration information for estimating a growth condition of the crop that is stored in a storage unit, and estimating the growth condition of the crop based on the information relating to the crop and the crop registration information;

a sprinkling water volume determination step of determining one or more sprinklers to be driven from among a plurality of sprinklers and determining an amount of water to be sprinkled by the one or more sprinklers; and a display step of displaying the growth condition estimated in the growth estimation step, wherein the information relating to the crop being cultivated is acquired from a first light and a second light receiving unit, the first light receiving unit detecting an intensity of light that is reflected by the crop that is cultivated in a farmland and the second light receiving unit detecting an intensity of light from a light source, a growth index of the crop is calculated based on a measured value of the light intensity detected by the first light receiving unit and a measured value the light intensity detected by of the second light receiving unit, and a soil moisture of each area of a plurality of areas of a farmland, in which the plurality of sprinklers are arranged, is detected; and the detected soil moisture of each area is compared against a prescribed value;

the amount of water to be sprinkled is determined based on the comparison of the detected soil moisture of each area with the prescribed value; and the determined one or more sprinklers are driven to sprinkle the determined amount of water.

\* \* \* \* \*